US007738913B2

(12) United States Patent
Hilpisch et al.

(10) Patent No.: US 7,738,913 B2
(45) Date of Patent: Jun. 15, 2010

(54) WIRELESS COMMUNICATIONS PROTOCOL

(75) Inventors: Robert E. Hilpisch, Savage, MN (US); Rob Duchscher, Rosemount, MN (US); Mark Seel, Roseville, MN (US); Peter Soren Kirk Hansen, Klampenborg (DK)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 12/415,521

(22) Filed: Mar. 31, 2009

(65) Prior Publication Data
US 2009/0180651 A1 Jul. 16, 2009

Related U.S. Application Data

(62) Division of application No. 11/001,688, filed on Dec. 1, 2004, now Pat. No. 7,529,565.

(60) Provisional application No. 60/560,835, filed on Apr. 8, 2004.

(51) Int. Cl.
*H04M 1/00* (2006.01)
(52) U.S. Cl. .............. 455/550.1; 455/556.1; 455/556.2; 381/315
(58) Field of Classification Search .............. 455/550.1, 455/556.1, 556.2; 381/315
See application file for complete search history.

(56) References Cited

U.S. PATENT DOCUMENTS

| 5,012,520 | A | 4/1991 | Steeger |
| 5,721,783 | A | 2/1998 | Anderson |
| 5,824,022 | A | 10/1998 | Zilberman et al. |
| 5,867,223 | A | 2/1999 | Schindler et al. |
| 5,956,330 | A | 9/1999 | Kerns |
| 6,390,971 | B1 | 5/2002 | Adams et al. |

(Continued)

FOREIGN PATENT DOCUMENTS

EP 1357704 A2 10/2003

(Continued)

OTHER PUBLICATIONS

"U.S. Appl. No. 11/001,688, Response filed Oct. 23, 2008 to Restriction Requirement mailed Sep. 24, 2008", 9 pgs.

(Continued)

*Primary Examiner*—Danh C Le
(74) *Attorney, Agent, or Firm*—Schwegman, Lundberg & Woessner, P.A.

(57) ABSTRACT

Systems and methods are provided to wirelessly communicate with a wireless communication protocol. One aspect of the present subject matter relates to a method performed by a hearing instrument for a user. According to various embodiments, local sound is converted into a processed acoustic signal for the user of the hearing instrument, and wireless communications within a wireless network that includes the hearing instrument is controlled using a wireless communications protocol. The wireless communications protocol includes a transmission protocol module, a link protocol module, an extended protocol module, a data protocol module, and an audio protocol module. The transmission protocol module is adapted to control transceiver operations to provide half duplex communication over a single wireless communication channel, and the link protocol module is adapted to implement a packet transmission process to account for frame collisions on the channel. Other aspects and embodiments are provided herein.

26 Claims, 18 Drawing Sheets

U.S. PATENT DOCUMENTS

| | | | |
|---|---|---|---|
| 6,690,273 | B2 | 2/2004 | Thomason |
| 6,694,034 | B2 | 2/2004 | Julstrom et al. |
| 6,879,695 | B2 * | 4/2005 | Maltan et al. ............... 381/315 |
| 7,257,372 | B2 | 8/2007 | Kaltenbach et al. |
| 7,529,565 | B2 | 5/2009 | Hilpisch et al. |
| 2002/0015506 | A1 | 2/2002 | Aceti et al. |
| 2003/0045283 | A1 * | 3/2003 | Hagedoorn ................. 455/426 |
| 2003/0064746 | A1 * | 4/2003 | Rader et al. ................. 455/550 |
| 2003/0097037 | A1 * | 5/2003 | Miller ......................... 600/25 |
| 2003/0152243 | A1 | 8/2003 | Julstrom et al. |
| 2003/0223606 | A1 * | 12/2003 | Blumenau ................... 381/312 |
| 2004/0010181 | A1 | 1/2004 | Feeley et al. |
| 2004/0116151 | A1 * | 6/2004 | Bosch et al. ............. 455/550.1 |
| 2004/0136543 | A1 | 7/2004 | White et al. |
| 2005/0032500 | A1 | 2/2005 | Nashif et al. |
| 2005/0075149 | A1 | 4/2005 | Gerber et al. |
| 2005/0255843 | A1 | 11/2005 | Hilpisch et al. |
| 2005/0282592 | A1 | 12/2005 | Frerking et al. |

FOREIGN PATENT DOCUMENTS

| | | | |
|---|---|---|---|
| WO | WO-2005101731 | A2 | 10/2005 |
| WO | WO-2005101731 | A3 | 10/2005 |

OTHER PUBLICATIONS

"U.S. Appl. No. 11/001,688, Notice of Allowance mailed Jan. 9, 2009", 7 pgs.

"U.S. Appl. No. 11/001,688, Restriction Requirement mailed Sep. 24, 2008", 7 pgs.

"Chinese Application Serial No. 200580018348.2, Office Action Mailed May 8, 2009", 6 pgs.

"International Application Serial No. PCT/US2005/011791, International Search Report mailed Nov. 25, 2005", 7 pgs.

Khattab, T. M. S, "Analysis of Wireless CSMA/CA Network Using Single Station Superposition (SSS)", *AEU International Journal of Electronics and Communications,* 56 (2), (2002), 73-83.

Wasem, O. J., et al., "The Effect of Waveform Substitution on the Quality of PCM Packet Communications", *IEEE Transactions on Acoustics, Speech, and Signal Processing,* 36(3), (1988), 342-348.

* cited by examiner

BYTE ORDERING

| BYTE 3 (MSB) | BYTE 2 | BYTE 1 | BYTE 0 (LSB) |
|---|---|---|---|
| OFFSET N | OFFSET N+1 | OFFSET N+2 | OFFSET N+3 |

FIG. 9

BIT ORDERING

| BIT 7 (MSB) | BIT 6 | BIT 5 | BIT 4 | BIT 3 | BIT 2 | BIT 1 | BIT 0 (MSB) |
|---|---|---|---|---|---|---|---|

FIG. 10

| FRAME START FLAG | SIZE | FRAME DESCRIPTOR | ADDRESS | EXTENDED PROTOCOL | PAYLOAD (SDU) | FRAME CHECK SEQUENCE | FRAME END FLAG |
|---|---|---|---|---|---|---|---|

FIG. 11

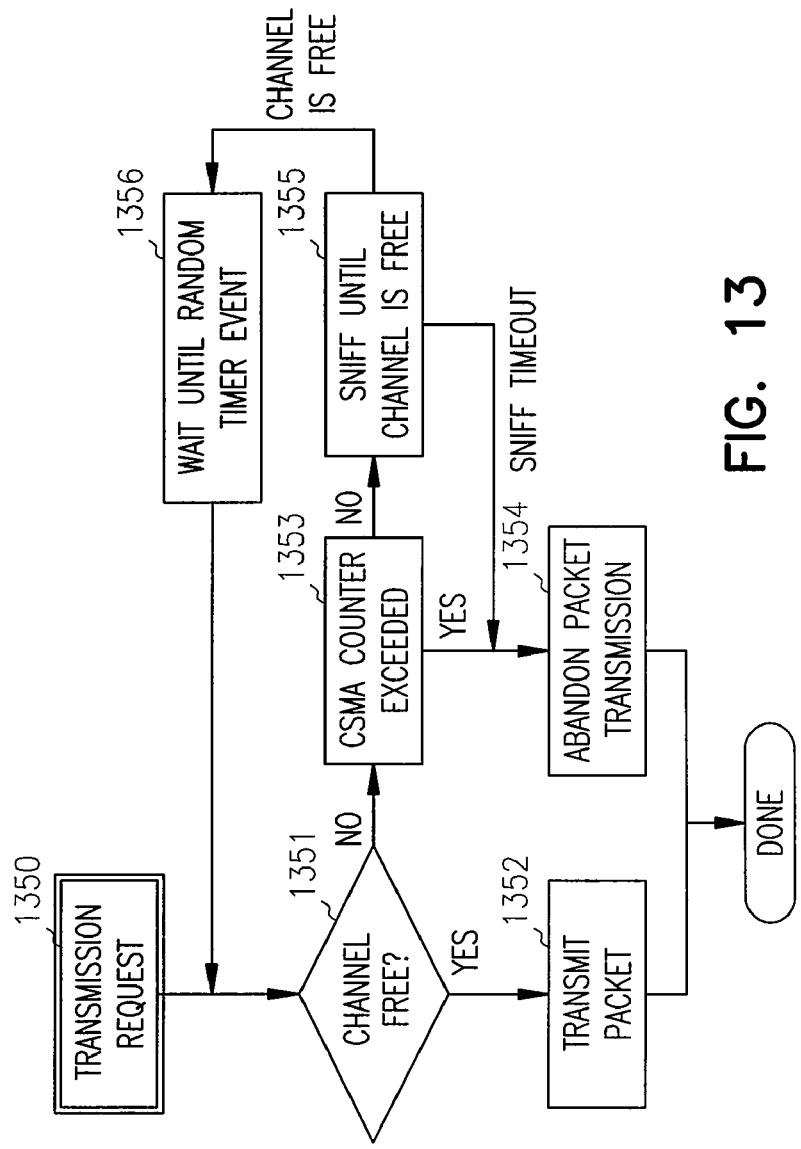

FIG. 15

| SIZE | DESC | ADDRESS | | | | HEARING AID DATA | FRAME CHECK SEQUENCE |
|---|---|---|---|---|---|---|---|
| | | DEST VENDOR | DESTINATION DEVICE ID | SRC VENDOR | SOURCE DEVICE ID | | |
| 0X10 | 01101101B | 0X04 | 0X11223344 | 0X04 | 0X12345678 | 0XAABBCCDDEE | 0XC9DAA99D |

FIG. 16

| SIZE | DESC | ADDRESS | | | | FRAME CHECK SEQUENCE |
|---|---|---|---|---|---|---|
| | | DEST VENDOR | DESTINATION DEVICE ID | SRC VENDOR | SOURCE DEVICE ID | |
| 0X0B | 00001101B | 0X04 | 0X12345678 | 0X04 | 0X11223344 | 0XC0599A9C |

FIG. 17

| AUDIO DESCRIPTOR | EMBEDDED DATA SIZE | AUDIO CODEC DATA | EMBEDDED DATA |
|---|---|---|---|

| 7 | 6 | 5 | 4 | 3 | 2 | 1 | 0 |
|---|---|---|---|---|---|---|---|
| EMBEDDED DATA FIELD | EMBEDDED DATA PROTOCOL ID | AUDIO CODEC | | | | | |

FIG. 18

| SIZE | FRAME DECRIPTOR | DESTINATION ADDRESS (SHORT) | AUDIO PAYLOAD | | |
|---|---|---|---|---|---|
| | | | AUDIO DESCRIPTOR HEADER | AUDIO CODEC HEADER | AUDIO CODEWORDS |
| 0XNN | 00010010B | 0X6D | 00000010B | 00101110B | -------- |

FIG. 19

| AUDIO HEADER | DATA VALUES |
|---|---|

FIG. 20

| 7 | 6 | 5 | 4 | 3 | 2 | 1 | 0 |
|---|---|---|---|---|---|---|---|
| MULTI-CHANNEL MODE | SAMPLING FREQUENCY | | | | BIT-RATE MODE | | RESET |

| SIZE | FRAME DESC | ADDRESS | | | | NETWORK SERVICE ID | REQ OPCODE | VENDOR ID | DEVICE ID |
|---|---|---|---|---|---|---|---|---|---|
| | | DEST VENDOR | DESTINATION DEVICE ID | SRC VENDOR | SOURCE DEVICE ID | | | | |
| 0X12 | | 0XAA | 0XBBBBBBBB | 0XCC | 0XDDDDDDDD | 0X01 | 0X03 OR 0X04 | 0XEE | 0XFFFFFFFF |

FIG. 24

| SIZE | FRAME DESC | ADDRESS | | | | NETWORK SERVICE ID | RESP OPCODE |
|---|---|---|---|---|---|---|---|
| | | DEST VENDOR | DESTINATION DEVICE ID | SRC VENDOR | SOURCE DEVICE ID | | |
| 0X0D | 00111101B | 0XCC | 0XDDDDDDDD | 0XAA | 0XBBBBBBBB | 0X01 | 0X01 OR 0X02 |

FIG. 25

| SIZE | FRAME DESC | ADDRESS | | | | NETWORK SERVICE ID | REQ OPCODE | SHORT ADDRESS |
|---|---|---|---|---|---|---|---|---|
| | | DEST VENDOR | DESTINATION DEVICE ID | SRC VENDOR | SOURCE DEVICE ID | | | |
| 0X12 | | 0XAA | 0XBBBBBBBB | 0XCC | 0XDDDDDDDD | 0X01 | 0X03 OR 0X04 | 0XFF |

FIG. 26

| SIZE | FRAME DESC | ADDRESS | | | | NETWORK SERVICE ID | RESP OPCODE |
|---|---|---|---|---|---|---|---|
| | | DEST VENDOR | DESTINATION DEVICE ID | SRC VENDOR | SOURCE DEVICE ID | | |
| 0X0D | 00111101B | 0XCC | 0XDDDDDDDD | 0XAA | 0XBBBBBBBB | 0X01 | 0X01 OR 0X02 |

FIG. 27

| SIZE | FRAME DESC | ADDRESS | | | | NETWORK SERVICE ID | REQ OPCODE |
|---|---|---|---|---|---|---|---|
| | | DEST VENDOR | DESTINATION DEVICE ID | SRC VENDOR | SOURCE DEVICE ID | | |
| 0X0E | 00111101B | 0XAA | 0XBBBBBBBB | 0XCC | 0XDDDDDDDD | 0X01 | 0X07 OR 0X08 |

FIG. 28

| SIZE | FRAME DESC | ADDRESS | | | | NETWORK SERVICE ID | RESP OPCODE |
|---|---|---|---|---|---|---|---|
| | | DEST VENDOR | DESTINATION DEVICE ID | SRC VENDOR | SOURCE DEVICE ID | | |
| 0X0D | 00111101B | 0XCC | 0XDDDDDDDD | 0XAA | 0XBBBBBBBB | 0X01 | 0X01 OR 0X02 |

FIG. 29

| SIZE | FRAME DESC | ADDRESS | | | | NETWORK SERVICE ID | REQ OPCODE |
|---|---|---|---|---|---|---|---|
| | | DEST VENDOR | DESTINATION DEVICE ID | SRC VENDOR | SOURCE DEVICE ID | | |
| 0X0E | 00111101B | 0XAA | 0XBBBBBBBB | 0XCC | 0XDDDDDDDD | 0X01 | 0X09 OR 0X0A |

FIG. 30

| SIZE | FRAME DESC | ADDRESS | | | | NETWORK SERVICE ID | RESP OPCODE |
|---|---|---|---|---|---|---|---|
| | | DEST VENDOR | DESTINATION DEVICE ID | SRC VENDOR | SOURCE DEVICE ID | | |
| 0X0D | 00111101B | 0XCC | 0XDDDDDDDD | 0XAA | 0XBBBBBBBB | 0X01 | 0X01 OR 0X02 |

FIG. 31

| SIZE | FRAME DESC | ADDRESS | | | | NETWORK SERVICE ID | REQ OPCODE |
|---|---|---|---|---|---|---|---|
| | | DEST VENDOR | DESTINATION DEVICE ID | SRC VENDOR | SOURCE DEVICE ID | | |
| 0X0D | 00111101B | 0XAA | 0XFFFFFFFF | 0XCC | 0XDDDDDDDD | 0X02 | 0X01, 0X02 OR 0X03 |

FIG. 32

| SIZE | FRAME DESC | ADDRESS | | | | NETWORK SERVICE ID | RESP OPCODE |
|---|---|---|---|---|---|---|---|
| | | DEST VENDOR | DESTINATION DEVICE ID | SRC VENDOR | SOURCE DEVICE ID | | |
| 0X0D | 00111101B | 0XCC | 0XDDDDDDDD | 0XAA | 0XBBBBBBBB | 0X02 | 0X04, 0X05 OR 0X06 |

FIG. 33

| SIZE | FRAME DESC | ADDRESS | | | | NETWORK SERVICE ID | REQ OPCODE |
|---|---|---|---|---|---|---|---|
| | | DEST VENDOR | DESTINATION DEVICE ID | SRC VENDOR | SOURCE DEVICE ID | | |
| 0X0D | 00111101B | 0XAA | 0XBBBBBBBB | 0XCC | 0XDDDDDDDD | 0X02 | 0X07 |

FIG. 34

| SIZE | FRAME DESC | ADDRESS | | | | NETWORK SERVICE ID | RESP OPCODE | ADDR INFO DATA |
|---|---|---|---|---|---|---|---|---|
| | | DEST VENDOR | DESTINATION DEVICE ID | SRC VENDOR | SOURCE DEVICE ID | | | |
| 0X15 | 00111101B | 0XCC | 0XDDDDDDDD | 0XAA | 0XBBBBBBBB | 0X02 | 0X08 | 0X0101AABBBBBBBB69 |

FIG. 35

| SIZE | FRAME DESC | ADDRESS | | | | NETWORK SERVICE ID | REQ OPCODE |
|---|---|---|---|---|---|---|---|
| | | DEST VENDOR | DESTINATION DEVICE ID | SRC VENDOR | SOURCE DEVICE ID | | |
| 0X0E | 00111101B | 0XAA | 0XBBBBBBBB | 0XCC | 0XDDDDDDDD | 0X02 | 0X09 |

FIG. 36

| SIZE | FRAME DESC | ADDRESS | | | | NETWORK SERVICE ID | RESP OPCODE | EXTENDED DEVICE INFO DATA |
|---|---|---|---|---|---|---|---|---|
| | | DEST VENDOR | DESTINATION DEVICE ID | SRC VENDOR | SOURCE DEVICE ID | | | |
| 0X2D | 00111101B | 0XCC | 0XDDDDDDDD | 0XAA | 0XBBBBBBBB | 0X02 | 0X0A | ------- |

FIG. 37

| SIZE | FRAME DESC | ADDRESS | | | | NETWORK SERVICE ID | REQ OPCODE |
|---|---|---|---|---|---|---|---|
| | | DEST VENDOR | DESTINATION DEVICE ID | SRC VENDOR | SOURCE DEVICE ID | | |
| 0X0D | 00111101B | 0XAA | 0XBBBBBBBB | 0XCC | 0XDDDDDDDD | 0X02 | 0X0B |

FIG. 38

| SIZE | FRAME DESC | ADDRESS | | | | NETWORK SERVICE ID | RESP OPCODE | AUDIO INFO DATA |
|---|---|---|---|---|---|---|---|---|
| | | DEST VENDOR | DESTINATION DEVICE ID | SRC VENDOR | SOURCE DEVICE ID | | | |
| 0X15 | 00111101B | 0XCC | 0XDDDDDDDD | 0XAA | 0XBBBBBBBB | 0X02 | 0X0C | 0X0201000205 |

FIG. 39

| SIZE | FRAME DESC | DEST ADDRESS | NETWORK SERVICE ID | REQ OPCODE | CODECID | CODECFS | FRAMESIZE | OPTIONS |
|---|---|---|---|---|---|---|---|---|
| 0X08 | 0X3E | 0XAA | 0X04 | 0X01 | 0X02 | 0X05 | 0XC0 | 00000110B |

FIG. 40

| SIZE | FRAME DESC | DEST ADDRESS | NETWORK SERVICE ID | REQ OPCODE |
|---|---|---|---|---|
| 0X04 | 0X3E | 0XAA | 0X04 | 0X02 |

WIRELESS COMMUNICATIONS PROTOCOL

CROSS-REFERENCE TO RELATED APPLICATION

This application is a divisional of U.S. application Ser. No. 11/001,688, filed Dec. 1, 2004, now U.S. Pat. No. 7,529,565 which claims the benefit of U.S. Provisional Patent Application No. 60/560,835, filed on Apr. 8, 2004, under 35 U.S.C. §119(e).

TECHNICAL FIELD

This application relates generally to communication systems, devices and methods and, more particularly, to wireless communication protocols.

BACKGROUND

Various electronic devices wirelessly communicate with each other. A hearing instrument, such as a hearing aid or other device to assist with hearing, is one type of device capable of wireless communications. For example, two hearing aids may communicate with each other to binaurally present sound to a wearer. In another example, a programmer wirelessly communicates with and configures a hearing aid. In another example, a hearing aid wirelessly receives a signal from an assistive listening system to provide or enhance a signal for presentation to a receiver in the hearing aid. The receiver converts the signal into a sound that can be heard by the hearing aid wearer. More complex functions and therapies are being proposed as hearing aid technology improves.

It is desired to network wireless devices to take advantage of improving hearing instrument technologies. There is a need in the art to provide improved communication systems and methods for transmitting and receiving short range data, which can be used for wireless communication between hearing instruments.

SUMMARY

The above-mentioned problems are addressed by the present subject matter and will be understood by reading and studying the following specification. Various aspects and embodiments of the present subject matter provide a wireless hearing instrument communication protocol.

One aspect of the present subject matter relates to a method performed by a hearing instrument for a user. According to various embodiments, local sound is converted into a processed acoustic signal for the user of the hearing instrument, and wireless communications within a wireless network that includes the hearing instrument is controlled using a wireless communications protocol. The wireless communications protocol includes a transmission protocol module, a link protocol module, an extended protocol module, a data protocol module, and an audio protocol module. The transmission protocol module is adapted to control transceiver operations to provide half duplex communication over a single wireless communication channel, and the link protocol module is adapted to implement a packet transmission process to account for frame collisions on the channel.

One aspect of the present subject matter relates to a hearing instrument. According to various embodiments, the hearing aid comprises a transceiver to wirelessly transmit data and wirelessly receive data over a single wireless communication channel, a processor and a memory capable of communicating with each other, and circuitry connecting the processor to the transceiver. The memory includes instructions to be operated on by the processor. The instructions include a layered wireless communication protocol for use to communicate with at least one other node on a wireless network. The layered wireless communication protocol includes a transmission protocol module, a link protocol module, an extended protocol module, a data protocol module, and an audio protocol module. The transmission protocol module operates at a first layer of the wireless communication protocol to control and monitor transceiver operation. The transmission protocol module is adapted to control transceiver operations to provide half duplex communication over the single wireless communication channel. The link protocol module operates at a second layer of the wireless communication protocol to define data transmitting and receiving procedures, and present data suitable for transmission, wherein the link protocol module is adapted to implement a packet transmission process to account for frame collisions. Each of the extended protocol module, the data protocol module, and the audio protocol module operate at a third layer of the wireless communication protocol. The extended protocol module provides access to network service protocols. The data protocol module communicates data regarding control and configuration information for hearing instruments. The audio protocol module communicates digital audio. The audio protocol module is adapted to stream digital audio one way over the single wireless communication channel.

One aspect of the present subject matter relates to a data structure for a wireless communication protocol residing in a computer-accessible medium. According to various embodiments, the data structure comprises a Layer 1 protocol level, a Layer 2 protocol level, and a Layer 3 protocol level. The Layer 1 protocol level includes a transmission protocol module to control and monitor operation of a wireless transceiver to provide half duplex communication over a single communication channel. The Layer 2 protocol level includes a link protocol module to control data reception and transmission, and to present data to and receive data from the Layer 1 protocol level. The link protocol module is adapted to implement a packet transmission process to account for frame collisions. The Layer 3 protocol level includes a hearing aid data transfer protocol module, an extended protocol module, and an audio protocol module. The hearing aid data transfer protocol module is adapted to organize and transfer data to and receive data from the Layer 2 protocol level. The data includes hearing aid programming data. The extended protocol module is adapted to present data to and receive data from the Layer 2 protocol level for use to access network services. The audio protocol module is adapted to stream digital audio and to present data to and receive data from the Layer 2 protocol level.

One aspect of the present subject matter relates to a method of wirelessly transmitting data packets from a wireless hearing aid over a network. According to various embodiments of the method, in response to a transmission request from the wireless hearing aid, it is determined if a wireless communication channel is free, and the packet is transmitted over the channel if the channel is determined to be free. If the channel is not free, the channel is sniffed to determine when the channel is free. When the channel is free, the method waits for a random time period. After the random time period, it is determined if the channel is free and the packet is transmitted over the channel if the channel is free.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their legal equivalents.

BRIEF DESCRIPTION OF THE DRAWINGS

FIG. 9 illustrates multi-byte values such as 16 and 32 bit values ordered in decreasing significance from the Most Significant Byte (MSB) of the value to the Least Significant Byte (LSB) of the value.

FIG. 10 illustrates a byte ordered with Bit 7, the Most Significant Bit (MSB), transmitted first and Bit 0, the Least Significant Bit (LSB) transmitted last.

FIG. 11 illustrates the general link layer PDU format, according to various embodiments of the present subject matter.

FIG. 12 illustrates a frame descriptor, according to various embodiments of the present subject matter.

FIG. 13 illustrates a process for transmitting a packet that accounts for frame collision, according to various embodiments of the present subject matter.

FIG. 15 illustrates an example of a PDU frame format for use by a Programmer to communicate data to a hearing aid, according to various embodiments of the present subject matter.

FIG. 16 illustrates an example of a Layer 2 acknowledgement packet returned by the destination, according to various embodiments of the present subject matter.

FIG. 17 illustrates an audio transfer payload, according to various embodiments of the present subject matter.

FIG. 18 illustrates an audio descriptor field for the audio transfer payload of FIG. 17, according to various embodiments of the present subject matter.

FIG. 19 illustrates a PDU format for an audio transfer protocol, according to various embodiments of the present subject matter.

FIG. 20 illustrates a G.722 audio codec data frame format, according to various embodiments of the present subject matter.

FIG. 21 illustrates an audio header for the frame format illustrated in FIG. 20, according to various embodiments.

FIG. 23 illustrates a PDU format for a long address assign/un-assign request, according to various embodiments of the present subject matter.

FIG. 24 illustrates a PDU format for an accept or reject response, according to various embodiments of the present subject matter.

FIG. 25 illustrates a PDU format for a short address assign/un-assign request, according to various embodiments of the present subject matter.

FIG. 26 illustrates a PDU format for an accept or reject response, according to various embodiments of the present subject matter.

FIG. 27 illustrates a PDU format for a 8B10B/Manchester request, according to various embodiments of the present subject matter.

FIG. 28 illustrates a PDU format for an accept or reject response, according to various embodiments of the present subject matter.

FIG. 29 illustrates a PDU format for a power down/up request, according to various embodiments of the present subject matter.

FIG. 30 illustrates a PDU format for an accept or reject response, according to various embodiments of the present subject matter.

FIG. 31 illustrates a PDU format for a ping request, according to various embodiments of the present subject matter.

FIG. 32 illustrates a PDU format for a ping response, according to various embodiments of the present subject matter.

FIG. 33 illustrates a PDU format for an address info request, according to various embodiments of the present subject matter.

FIG. 34 illustrates a PDU format for an address info response, according to various embodiments of the present subject matter.

FIG. 35 illustrates a PDU format for an address info request, according to various embodiments of the present subject matter.

FIG. 36 illustrates a PDU format for an extended device info response, according to various embodiments of the present subject matter.

FIG. 37 illustrates a PDU format for an audio info request, according to various embodiments of the present subject matter.

FIG. 38 illustrates a PDU format for an audio info response with two streams supported, according to various embodiments of the present subject matter.

FIG. 39 illustrates a PDU format for an audio start request, according to various embodiments of the present subject matter.

FIG. 40 illustrates a PDU format for an audio stop request, according to various embodiments of the present subject matter.

DETAILED DESCRIPTION

Figure 1:
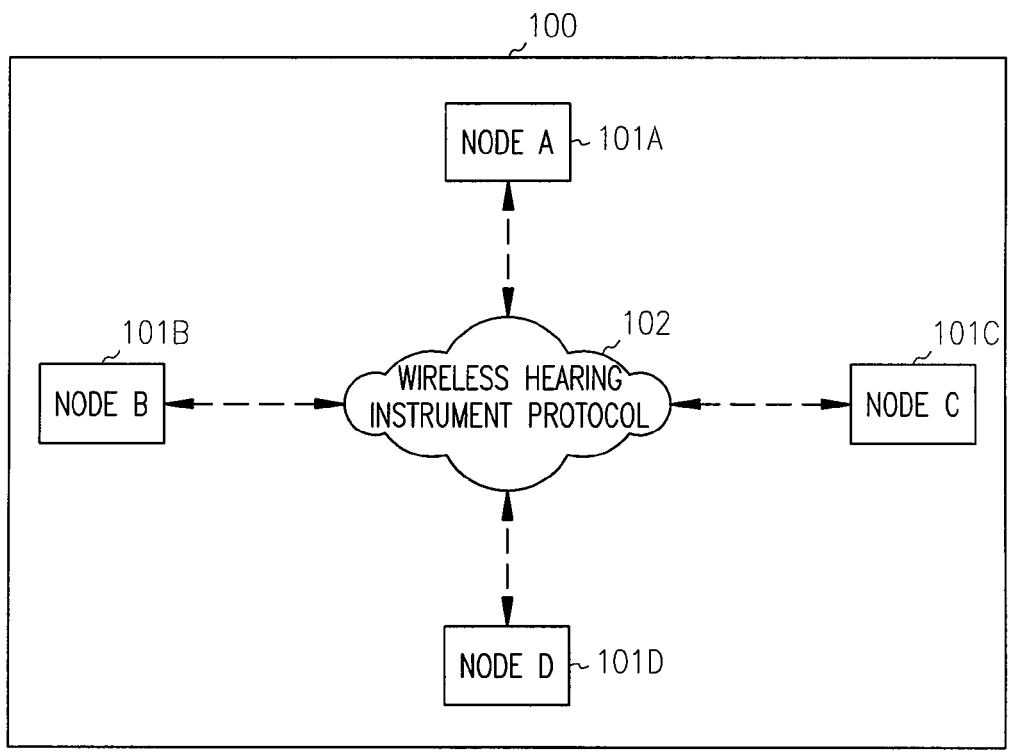
FIG. 1 illustrates an embodiment of a wireless network.

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. The following detailed description is, therefore, not to be taken in a limiting sense, and the scope of the present subject matter is defined only by the appended claims, along with the full scope of legal equivalents to which such claims are entitled.

This document includes number of figures and tables that provide specific information pertaining to data fields, such as specific bit numbers, specific data field sequences and sizes, and specific bit mapping to specific values. These figures and tables illustrate an example according to various embodiments. The scope of this application is not intended to be limited to these specifics. Those of ordinary skill in the art will understand, upon reading and comprehending this disclosure, that other bit numbers, data field sequences and size, bit mapping and values can be used in other protocol embodiments.

The wireless hearing instrument communication protocol of the present subject matter provides a specification for interchanging information between hearing instruments over a radio frequency communications channel. This document describes the protocols used to encode data for proper transceiver operation, to transmit data to/from specific hearing instruments, and to share a transmission channel. Although considerations are made for various implementations, this document is not intended to detail or explore specific protocol implementations in hardware or software. One of ordinary skill in the art will understand, upon reading and comprehending this disclosure, how to provide specific protocol implementations.

The wireless protocol is designed to provide communication among hearing instruments. Hearing instruments, for example, include various types of hearing aids, assistive listening devices, headsets, programming modules, audio streaming modules, remote controls and wall synchronizers. The number of nodes (hearing instruments) on the network is considered to be low and therefore the communications channel contention should be relatively low in the case of data transmission but high in the case of audio streaming. The protocol is implemented using a combination of hardware and software components comprising a system with relatively tight constraints on processing speed and memory availability. These constraints are driven by the restrictions on power consumption and gate count imposed by requirements of hearing instrument hardware.

One configuration for the protocol involves a device such as a PC or hand-held remote and one or more hearing instruments. This configuration supports testing, fitting, adjusting and programming of the instruments. This configuration is an example of a synchronous master/slave relationship where the programmer commands the hearing instrument to perform a function and the hearing instrument responds appropriately. Another configuration for the protocol involves two hearing instruments functioning as a binaural pair. This configuration supports interchange of control information dynamically and automatically. In various embodiments of this configuration, the hearing instruments have a peer-to-peer relationship where either device is capable of asynchronously communicating information to a specific peer device. Another configuration involves a source device and one or more hearing instruments. This configuration supports the real-time streaming of audio data from a source device to one or more hearing instruments. This configuration is a one-way data stream from the source device and is expected to provide high channel bandwidth.

Support is provided in the protocol for a peer-to-peer method of communication as well as a master/slave relationship. An issue in a peer-to-peer communication scheme involves the possibility of collision occurring when two nodes attempt to transmit a message at the same time. Carrier sensing capabilities is provided to cope with this situation. Collisions generally can be avoided by having a would-be message sender detect that the channel is busy prior to transmission, in which case it generates a random back off period, waits that amount of time, and then tries again. The random back off time reduces the likelihood that two senders will attempt to transmit at the same time. There is a small window in which two senders are unable to see the busy channel in time and the resulting collision scrambles the messages. In this case the failure to see a reply within a timeout period results in collisions and retransmissions of the original message.

FIG. 1 illustrates an embodiment of a wireless network. The illustrated wireless network 100 is capable of communicating using a wireless communication protocol, according to various embodiments of the present subject matter. The illustrated network includes a number of nodes 101, labeled as Node A, Node B, Node C and Node D. Each node is a device capable of wireless communications over transmission distances up to approximately 1 meter. In various embodiments, the network includes one or more hearing instruments and one or more stations such as hearing instrument programmers, assistive listening devices and the like. Examples of assistive listening devices include devices that use wireless communication signals (such as inductive or RF signals) to assist a hearing impaired individual to hear a public address system, a radio, and the like. Various embodiments include other wireless communication nodes such as a computer and a wireless telephone. In various embodiments, these nodes are capable of accessing the Internet through the wireless network.

Figure 3:
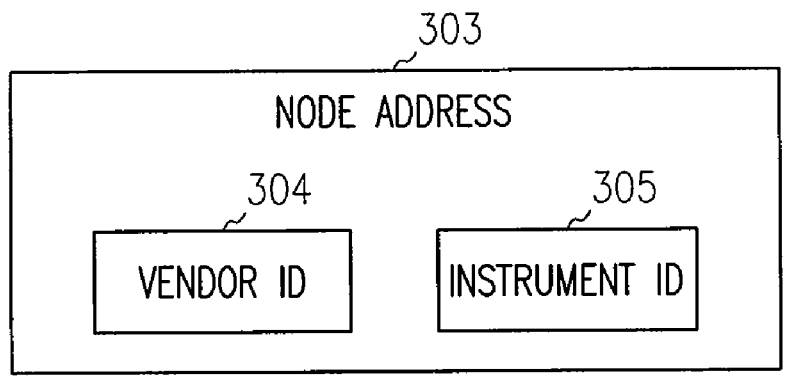
FIG. 3 illustrates a format for a node address, according to various embodiments of the present subject matter.

Each node 101A, 101B, 101C and 101D on the network 100 is uniquely identified with an address, illustrates with respect to FIG. 3, that allows for private wireless communication between two nodes through the wireless hearing instrument protocol 102. The protocol 102 is a set of rules relating to format and timing of data transmission between two or more devices such that the devices are able to communicate with each other.

The formulation of the unique address is implemented by a hearing instrument vendor. Examples include deriving the address from the serial number during power on initialization, or configuring the address into the instrument during the manufacturing process. According to various embodiments, the communication between any two nodes, station or hearing instruments, may be master/slave or peer to peer, depending on the application being used.

The communication between any two nodes is half-duplex. Half-duplex systems are capable of transmitting data in one direction at a time. Known half-duplex system use at least some of the same communication elements to send and receive signals, and use switches to change between receive and transmit modes. In a half duplex system, a first node initiates communication with a second node and waits for the appropriate host response.

A connection between two nodes in the illustrated network does not include intermediate nodes. Every node is capable of communicating directly to every other node in the network through the wireless hearing instrument protocol. Thus, a traditional network layer defined in the Open Systems Interconnect (OSI) protocol stack modes is non-existent for this protocol.

Figure 2A:
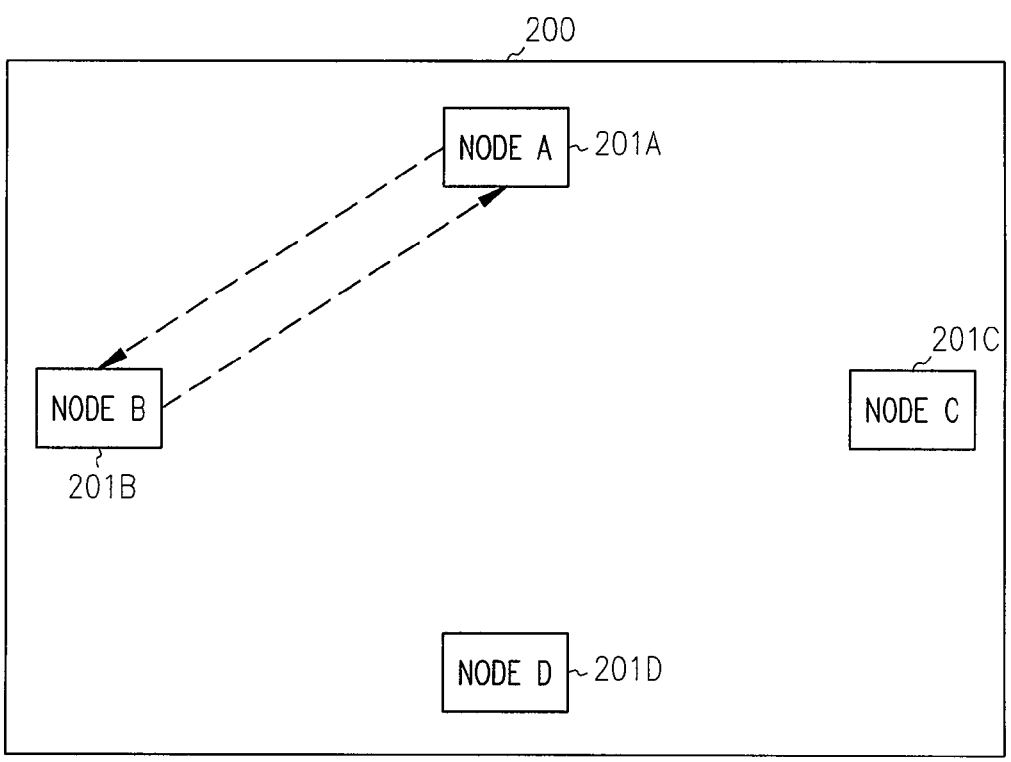
FIGS. 2A, 2B and 2C illustrate a unicast mode of communication, a broadcast mode of communication, and a multicast mode of communication, respectively, for the wireless network illustrated in FIG. 1.
Figure 2B:
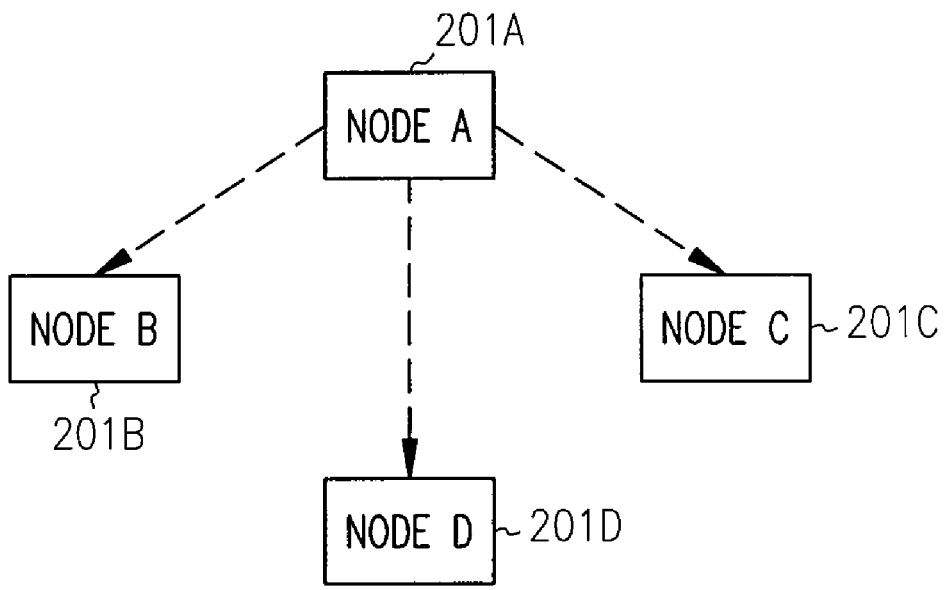
Figure 2C:
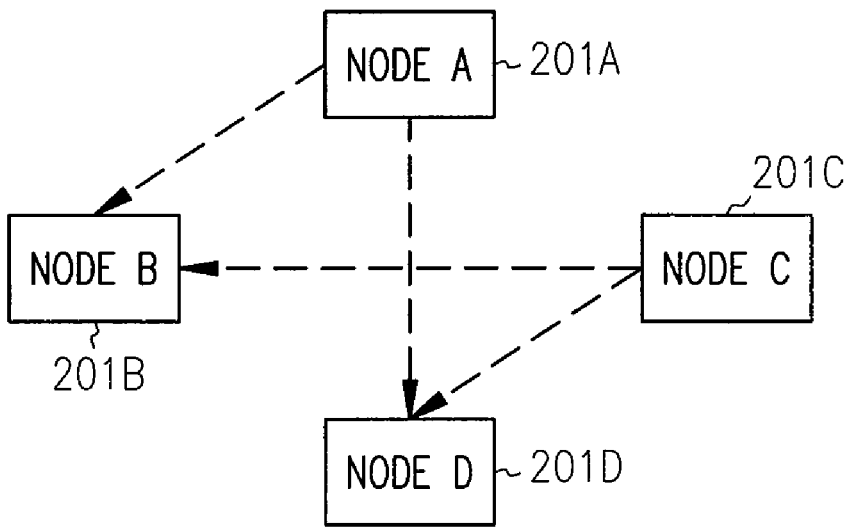

FIGS. 2A, 2B and 2C illustrate a unicast mode of communication, a broadcast mode of communication, and a multicast mode of communication, respectively, for the wireless network illustrated in FIG. 1. Unicast communication, illustrated in FIG. 2A, is a communication mode that involves two nodes. A first node 201A functions as a transmitter while a second node 201B functions as a receiver, and the second node 201B functions as a transmitter while the first node 201A functions as the receiver. Unicast communication involves one sender and one receiver. The node address value may be of either a long or short variety, depending on the application. Examples include a programmer communicating with a single hearing aid, two hearing aids communicating with each other, and the like.

Broadcast communication, illustrated in FIG. 2B, is a communication mode where one node 201A transmits a signal to a group of nodes 201B, 201C and 201D using the predefined broadcast address. Broadcast communication involves one sender and multiple receivers. The set of receivers can include receivers specific to one vendor, several vendors, or receivers across all vendors. One example includes an audio transmission intended for all hearing aids within the range of the transmitter in an auditorium situation.

Multicast communication, illustrated in FIG. 2C, is a communication mode involving a transmitter (e.g. 201A or 201C) and multiple receivers (e.g. 201A, 201B or 201B, 201D). Multicast communication involves a single sender and multiple receivers using an accepted dynamic address which can be either long or short. According to various embodiments, multicast mode is application specific in that the address value and its meaning are the responsibility of the application controlling the data flow. For example, the set of receivers can include receivers specific to one vendor, or receivers for several vendors. One example involves a programmer communicating information simultaneously to two hearing aids, such as audio information to a left and right hearing aid.

Various protocol embodiments consider two types of node addressing, which are referred to herein as long addressing and short addressing. Long addressing is used to uniquely identify a specific node within the global context. Short addressing is application dependent and is used to shorten the bit overhead of the protocol when increased levels of communication thru put are needed. The type of addressing used in a particular packet is indicated by bit settings in the frame, an example of which is provided below.

FIG. 3 illustrates a format for a node address, according to various embodiments of the present subject matter. Each node on the network, such as the network illustrated in FIG. 1, has a unique identifier 303. Various protocol embodiments use a long address to uniquely identify the node to establish communication without confusion regarding the intended destination of a communication packet. In various embodiments, the long address 303 provides a Vendor ID 304 and a Device ID 305. In various embodiments, the long address has the following format:

<Long Address (40 bits)>=<Vendor ID (8 bits)>+<Device ID (32 bits)>

The size and order of the data fields for the Vendor ID and Device ID can be different according to a desired protocol design. The Vendor ID 304 identifies the specific vendor, a group of vendors, or all vendors associated with the hearing instrument to which a packet is intended. In various embodiments, the Vendor ID 304 is an 8-bit value. Examples of Vendor ID values are shown below in Table 1. The present subject matter is not limited to the illustrated values and vendors.

TABLE 1

| Value | Hearing Instrument Vendor |
|---|---|
| 00000000 | Reserved |
| 00000001 | Oticon |
| 00000010 | Phonic Ear |
| 00000011 | Bernafon |
| 00000100 | Starkey |
| 00000101-11111110 | Unused |
| 11111111 | Indicates a broadcast or multicast to all hearing instruments across all vendor address spaces. |

The Device ID 305 identifies a device within the context of a Vendor ID.

Figure 4:
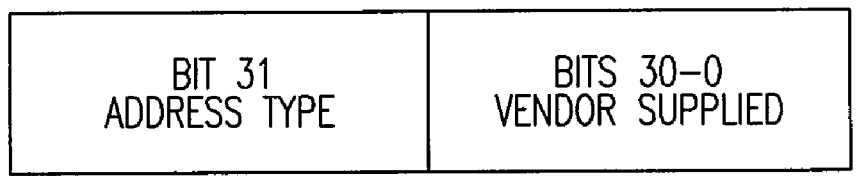
FIG. 4 illustrates a format for a Device ID, according to various embodiments of the present subject matter.

FIG. 4 illustrates a format for a Device ID, according to various embodiments of the present subject matter. The illustrated Device ID, such as can be used in the long address example provided above, is a unique 32-bit value. The Device ID can not be duplicated within the context of the vendor. The usage of the 32-bit device address space is vendor specific. In some embodiments, Device ID 0x00000000 is reserved, Device ID 0xFFFFFFFF is used for the destination address when broadcast packets are sent, and the upper most bit of the Device ID is reserved to indicate an address type (whether a Device ID is a unicast or multicast address). The present subject matter is not limited to particular values or bit positions. Other values, bit positions and/or data field sized can be used for other protocol designs. Examples are provided in Table 2.

TABLE 2

| Bit 31 | Address Type |
|---|---|
| 0 | Unicast |
| 1 | Multicast |

In general a unicast address is assigned to only one device. Each vendor is responsible for allocating and maintaining the proper address range for any and all wireless devices, such as aids, remotes, programmers and the like, that are supported by that vendor.

Figure 5:
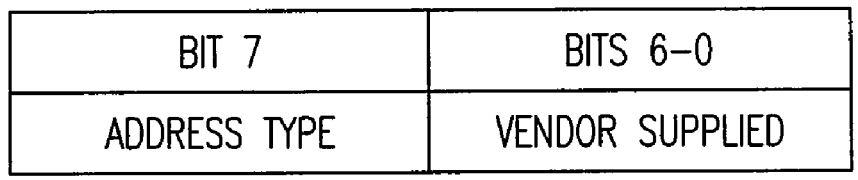
FIG. 5 illustrates a short address, according to various embodiments of the present subject matter.

FIG. 5 illustrates a short address, according to various embodiments of the present subject matter. The illustrated short addressing uses an 8-bit value to indicate the source and/or destination node(s) within a packet. Other protocol designs can use other data sizes for the short address. For example, short addressing can be used after a device's unique long address has been used to dynamically assign a short address to a node. Because short addresses are dynamic in nature, they may or may not be retained across power off/on or reset events. Since the generation, usage and control of short addresses is the responsibility of each vendor, the possibility of collisions/re-use of a short address by multiple vendors does exist. With respect to the illustrated example that provides an 8-bit short address space, various embodiments reserve the values 0x00 and 0xFF, and further reserve the short address 0xFF as a broadcast address. In addition, the upper most bit of the 8-bit short address is reserved as an address type, which is used to indicate if a short address is a unicast or multicast address. Other values, bit positions or data field sizes can be used for other protocol designs. Table 3 illustrates an assignment of an address type for the short address illustrated in FIG. 5, according to various embodiments of the present subject matter.

TABLE 3

| Bit 7 | Address Type |
|-------|--------------|
| 0     | Unicast      |
| 1     | Multicast    |

Protocol Stack

Various embodiments of the wireless hearing instrument communications protocol include a set of layered protocols. Each layer performs a set of logically related communications tasks while hiding, or abstracting, the details of the protocol layer implementation. Layering creates independence between layers by defining services provided by each layer to the next higher layer without defining how the services are to be implemented. Thus, due to the modular design, one protocol layer can be changed without affecting other layers.

Figure 6:
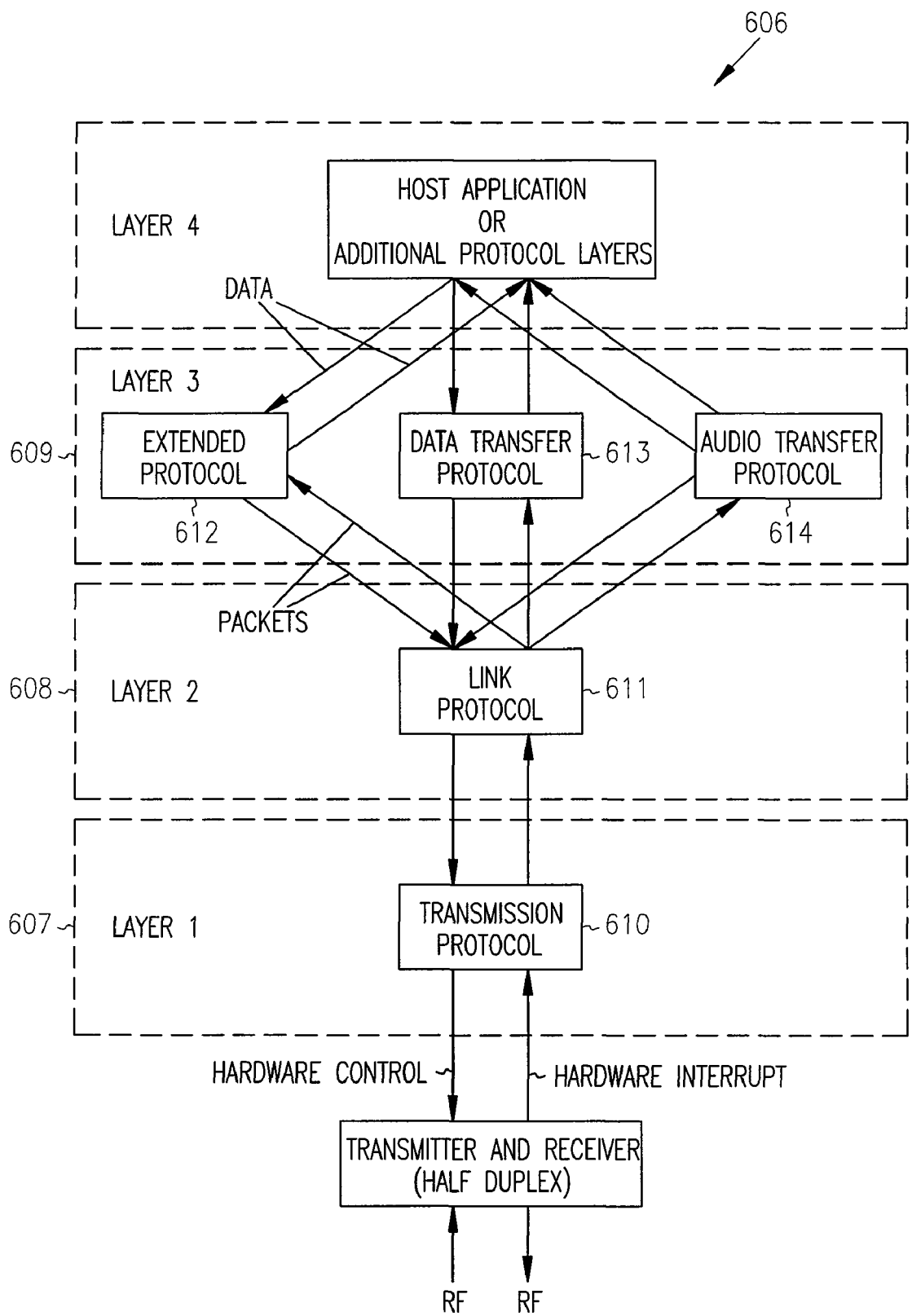
FIG. 6 illustrates a scheme of layered protocols for the wireless hearing instrument communication protocol, according to various embodiments of the present subject matter.

FIG. 6 illustrates a scheme of layered protocols for the wireless hearing instrument communication protocol, according to various embodiments of the present subject matter. The illustrated protocol 606, along with each of the modular protocols contained therein and their purpose, is described in detail below. These protocols are also categorized according to their layer level. A Layer 1 level 607 refers to a protocol that is the last one applied before transmitting a signal from a wireless communication device and the first one applied upon receiving a signal from another wireless communication device. The Layer 1 level includes the protocol information that is the most device-specific to the wireless hearing instrument as it relates to individual bit transmission. The Layer 1 level specifies how to control and monitor transceiver operation. For RF communication, the Layer 1 level serializes an RF channel, and is concerned only with individual bit transmission. A Layer 2 level 608 refers to a protocol that passes information to the Layer 1 level. A Layer 3 level 609 refers to a protocol that passes information to the Layer 2 protocol. The layering process can continue such that a Layer N refers to a protocol that passes information to a Layer N−1 level, which passes information to a Layer N−2 level, and so on until information is passed to the Layer 1 level.

The illustrated protocol 606 includes a number of layered protocols, including a transmission protocol 610, a link protocol 611, an extended protocol 612, a data transfer protocol 613, and an audio transfer protocol 614. In FIG. 6, the transmission protocol is illustrated in Layer 1, the link protocol is illustrated in Layer 2 and the extend protocol, data transfer protocol and audio transfer protocol are illustrated in Layer 3. The illustration also includes a host application or additional protocol layers, as represented generally at Layer 4. The labels "Layer 1," "Layer 2," "Layer 3," and "Layer 4" are provided to simplify the disclosure, and can also be referred to as a first layer, a second layer, a third layer and a fourth layer. Intermediate layers between the illustrated layers can be designed without changing the function of the illustrated protocol stack. One of ordinary skill in the art will understand, upon reading and comprehending this disclosure, how to incorporate a client application into the protocol. The layers modularize protocol implementation. The communications process is broken into smaller, less complex constituents while hiding the details of the actual implementation. This layering process in protocol design is also referred to as abstraction. A design goal is to reduce the dependence of one layer to another to minimize the need to modify other protocol layers when one protocol layer is changed.

Figure 7:
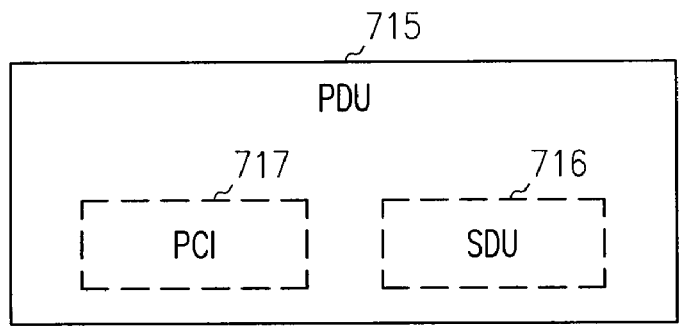
FIG. 7 illustrates an embodiment of a protocol data unit (PDU).

FIG. 7 illustrates an embodiment of a protocol data unit (PDU) 715. Each protocol layer provides services and a means to send and/or receive data. Data to be sent through a protocol is referred to a service data unit (SDU) 716. The SDU is encapsulated with protocol control information (PCI) 717 to form the PDU 715. The PDU for layer N becomes the SDU for protocol at layer N−1 and the process repeats, such as is illustrated in FIG. 8, for example.

Figure 8:
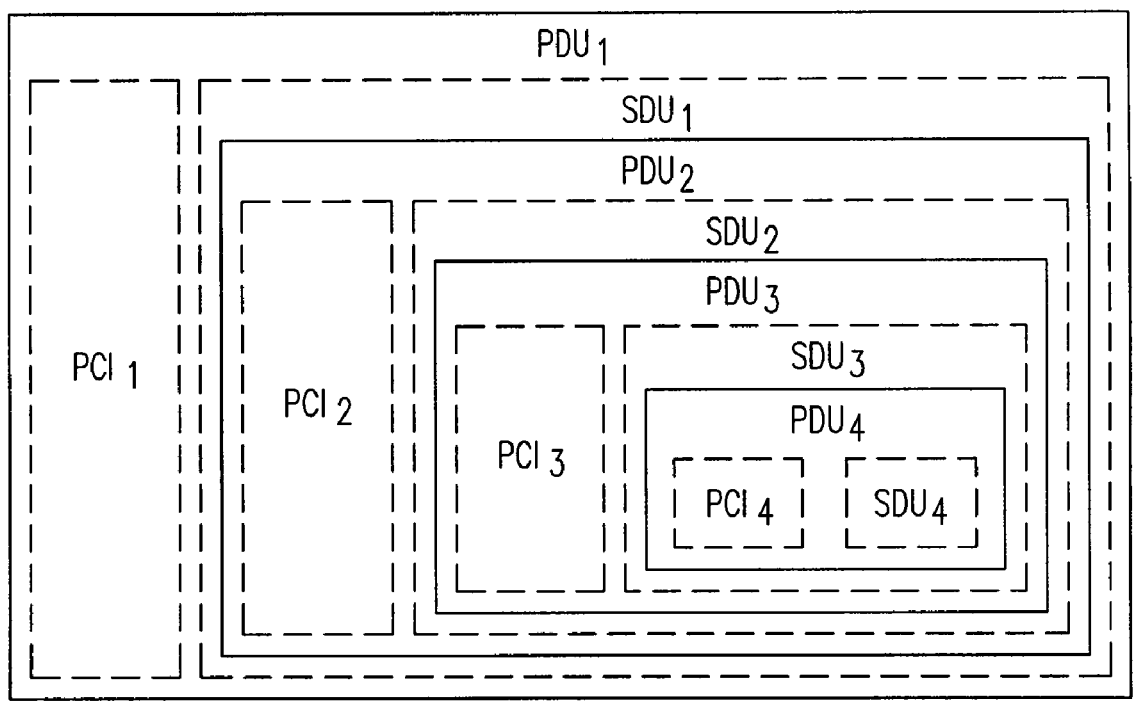
FIG. 8 illustrates encapsulation of a PDU associated with one layer within a PDU of another layer in the wireless communication protocol, according to various embodiments of the present subject matter.

FIG. 8 illustrates encapsulation of a PDU associated with one layer within a PDU of another layer in the wireless communication protocol, according to various embodiments of the present subject matter. A Layer 1 PDU ($PDU_1$) includes protocol control information ($PCI_1$) and a service data unit ($SDU_1$). As illustrated, $SDU_1$ encapsulates a Layer 2 PDU ($PDU_2$), which includes protocol control information ($PCI_2$) and a service data unit ($SDU_2$). $SDU_2$ encapsulates a Layer 3 PDU ($PDU_3$), which includes protocol control information ($PCI_3$) and a service data unit ($SDU_3$). $SDU_3$ encapsulates a Layer 4 PDU ($PDU_4$), which includes protocol control information ($PCI_4$) and a service data unit ($SDU_4$). One of ordinary skill in the art will understand, upon reading and comprehending this disclosure, that an SDU is capable of encapsulating more than one PDU. Thus, as illustrated in FIG. 6, the PDUs associated with the Layer 3 protocols (e.g. the extended protocol, the data transfer protocol, and the audio transfer protocol) are capable of being encapsulated in the SDU of the Layer 2 protocol (e.g. the link protocol).

A wireless communication protocol, according to various embodiments of the present subject matter, is discussed below.

Transmission Protocol (Layer 1)

The transmission protocol is functionally equivalent to the physical layer (procedures and protocols for physically sending data over lines) of the Open Systems Interconnection (OSI) model established by the International Standards Organization (ISO). This layer is a combination of transceiver hardware and software used to interface with hardware. The transmission protocol layer defines a way to control and monitor transceiver operation and addresses individual bit transmission. As illustrated in the protocol embodiment in FIG. 6, Layer 1 of the wireless communication protocol includes the transmission protocol. The transmission protocol provides three services: Read Data, Write Data, and Carrier Sense. According to various embodiments, the transmission protocol provides data serialization over an RF channel. In various embodiment, the PDU of the transmission protocol encodes data to provide a proper density of rising and falling edges, remove excessively repeated bit values, and avoid DC offsetting, which are desirable to ensure proper receiver operation and receiver phase locked loop (PLL) clock derivation. The transmission protocol is implemented as is deemed appropriate by the vendor. The transmission protocol does not impose restrictions on the amount (minimum or maximum) of data that is allowed to flow through during transmission or reception.

The encoded bit stream, which is associated with the data to be transmitted, allows a digital phase locked loop (DPLL) to extract the clock cycle and phase. Various embodiments encode the data using Manchester encoding. Manchester encoding involves transforming a 0 to a 01 bit sequence and a 1 to a 10 bit sequence. Incoming encoded data is preceded by zero or more preamble to allow for receiver PLL stabilization.

In various embodiments, data modulation includes amplitude shift keying (ASK). Various embodiments use 100% ASK in which a bit value of one is represented by the existence of a carrier signal and bit value of 0 is represented by the lack of a carrier signal. In various embodiments, the RF carrier frequency is 3.84 MHz, and the base RF channel data bit rate is defined to be 120 Kilobits per second (120 Kbps).

Link Protocol (Layer 2)

The data link layer encodes and decodes raw data bits into transmission bits such as RF transmission bits. It consists of two sub-layers responsible for Media Access Control (MAC) and the Logical Link Control (LLC) which controls frame synchronization, flow control, and error checking.

As illustrated in the protocol embodiment in FIG. 6, the link protocol operates at Layer 2. The link layer is functionally equivalent to the link layer (procedures and protocols for operating the communications lines, including ways to detect and correct message errors) of the OSI model. This protocol provides a procedural means to transmit or receive data to/from each node and presents data to Layer 1 suitable for transmission. Functions associated with various embodiments of the link protocol include: unicast, multicast, and broadcast data transmission modes; detection of bit errors in frame data (SDUs); and bit-stuffing to avoid false start and end flags.

According to various embodiments, multi-byte values such as 16 and 32 bit values are ordered in decreasing significance from the Most Significant Byte (MSB) of the value to the Least Significant Byte (LSB) of the value, such as generally shown in FIG. 9. The individual applications parse the multi-byte data. The MSB is placed into the data stream first, and the LSB is placed into the data stream last.

According to various embodiments, bit data is ordered in decreasing significance. A byte is ordered as generally illustrated in FIG. 10, with Bit 7, the Most Significant Bit (MSB), transmitted first and Bit 0, the Least Significant Bit (LSB) transmitted last.

A transmission code is used to improve the transmission characteristics of information to be transferred across the link. The transmission code ensures that sufficient transitions are present in a bit stream to make clock recovery possible at the receiver. Various protocol embodiments use the Manchester transmission code standard as the default method of encoding data bits on the wireless channel. The Manchester transmission code transforms a data bit 0 into a 01 Manchester bit sequence and a data bit 1 to a 10 Manchester bit sequence.

Bit stuffing is used to avoid false occurrences of the Start of Frame and End of Frame flags. When transmitting a packet, a data bit value of zero (0) is inserted after 9 consecutive data ones (1). When receiving a frame, the frame data will be scanned and a zero (0) bit value will be discarded after the occurrence of 9 consecutive ones (1). If the bit following 9 consecutive ones (1) is a one (1), it must be part of the Frame Start or End Flag. Bit stuffing is applied all data bits between, but not including, the Frame Start flag and the Frame End flag.

According to various protocol embodiments, the Manchester preamble is a 32-bit string which is transmitted prior to the Frame Start Flag. The Manchester preamble allows the receiving PLL the ability to acquire bit phase with the incoming packet data. The full preamble is not necessary if the receiving PLL is expected to be in bit phase with the incoming packet data. In various embodiments, the preamble has the following non-encoded and encoded formats (where "b" represents a binary value):

<Non Encoded Preamble>=10101010b+10101010b+ 10101010b+10101010b

<Encoded Preamble>=10011001 10011001b+ 10011001 10011001b+10011001 10011001b+ 10011001 10011001b Protocols can be designed to use other preamble formats.

Various protocol embodiments use the 8B/10B transmission code IEEE standard in place of the Manchester transmission code. When using the 8B/10B standard, an 8-bit byte of data is encoded into a 10-bit transport unit. The encoding technique guarantees a minimum rising edge density of 1 in 10 bits with a maximum run length of 5 bits of 1's or 0's.

According to various protocol embodiments, the 8B/10B preamble is a 32-bit string which is transmitted prior to the Start of Packet flag. The 8B/10B preamble allows the receiving PLL to acquire bit phase with the incoming packet data. The full preamble is not necessary if the receiving PLL is expected to be in bit phase with the incoming packet data. The 8B/10B preamble has the following non-encoded and encoded formats (where "b" represents a binary value):

<Non Encoded Preamble>=10110101b+10110101b+ 10110101b+10110101b

<Encoded Preamble>=1010101010b+1010101010b+ 1010101010b+1010101010b

Protocols can be designed to use other preamble formats.

The link protocol is also referred to as a framing protocol since it is associated with forming data frames. The protocol control information (PCI) for the link protocol is used to define a reliable point-to-point communication channel. Reliability is provided using an error detecting code (EDC) and a simple "stop-and-wait" method of acknowledgement and retransmission for lost or errored packet recovery.

FIG. 11 illustrates the general link layer PDU format, according to various embodiments of the present subject matter. The illustrates PDU includes the following eight fields: Frame Start Flag; Size; Frame Descriptor; Address; Extended Protocol; Payload (SDU); Frame Check Sequence; and Frame End Flag. Various protocol embodiments order the fields in various sequences. A brief description of each protocol data unit field, for the PDU illustrated in FIG. 10, is provided in Table 4. Table 4 also provides size information for an example of the fields. Other field sizes can be used in various protocol embodiments.

TABLE 4

| PDU Field | Size (Bytes) | Description |
| --- | --- | --- |
| Frame Start Flag | 1.5 (max) | Indicates the start of frame. The size is dependent upon the encoding scheme being used. |
| Size | 1 | The number of bytes following but not including the frame check sequence. |

TABLE 4-continued

| PDU Field | Size (Bytes) | Description |
|---|---|---|
| Frame Descriptor | 1 | Describes frame type and format |
| Address | 1-10 | Destination and (optional) Source Address. |
| Extended Protocol | 0-1 | Identifies the network service port at the next layer up if the Protocol Identifier is not one of the pre-defined types (see Frame Descriptor below). |
| Payload (SDU) | 0-253 | Service Data Unit (SDU) information. The maximum payload size of 253 assumes a frame descriptor followed by only a short destination address. |
| Frame Check Sequence | 0-4 | The frame check sequence (FCS) is calculated over the size byte thru the end of the payload. |
| Frame End Flag | 1.5 (max) | Indicates the end of the frame. (The size is dependent upon the encoding scheme being used.) |
| Totals | 6-263 | The minimum total calculation assumed the presence of a frame start flag, size byte, frame descriptor byte, single source short address and a frame end flag. The maximum total calculation assumed the presence of a frame start flag, size byte, frame descriptor byte, source and destination long address, max payload size, 4 byte frame check sequence and a frame end flag. |

In the illustrated example, the maximum payload size of 253 bytes is dependent upon using only a frame descriptor and a destination short address. If a frame descriptor and source and destination long address (10 bytes) are used, the maximum payload is 244 bytes. In various embodiments, the maximum number of payload bytes in a frame is calculated as follows:

Max. Frame Size (255)−Frame Desc. (1)−Address Bytes (1-10)−Extended Protocol (0 or 1)

In various protocol embodiments, the Manchester Frame Start Flag is a 12-bit flag that indicates the start of a new frame and allows the receiving device to establish the unit/byte phase of the inbound data. In various protocol embodiments, the Manchester Frame End Flag is a 12-bit flag that indicates the end of the PDU frame. In various embodiments, the Start Flag value is 0x7FE, and the End Flag value is 0x7FF.

In various protocol embodiments, the 8B/10B Frame Start Flag indicates the start of a new frame and allows the receiving device to establish the unit/byte phase of the inbound data. The value for the 8B/10B Frame Start Flag is the 10-bit encoded sequence defined in K27.7 "Table 36 Valid special code-groups" (page 44) of the IEEE 802.3-2002(part 3) standard. Its value is 110110_1000 for Current RD− and 001001_0111 for Current RD+.

In various protocol embodiments, the 8B/10B Frame End Flag indicates the end of the PDU frame. The value for the 8B/10B Frame End Flag is the 10-bit encoded sequence defined in K29.7 "Table 36 Valid special code-groups" (page 44) of the IEEE 802.3-2002(part 3) standard. Its value is 101110_1000 for Current RD− and 010001_0111 for Current RD+.

In various protocol embodiments, the frame size is an 8-bit value indicating the number of bytes following. In various embodiments, the frame size includes all data beginning with the frame descriptor through the end of the payload (SDU), and has a valid range is from 2 to 255.

FIG. 12 illustrates a frame descriptor, according to various embodiments of the present subject matter. The illustrated frame descriptor is adapted to be incorporated in the PDU illustrated in FIG. 11. In various protocol embodiments, the frame descriptor is an 8-bit value that describes the format of the frame and is divided into five bit fields, including a version field, an acknowledgement field, a protocol identifier, a frame check sequence (FCS) mode and an address mode. Various protocol embodiments use other field sizes and order the fields in other sequences. Some level of reliability is provided using a frame check sequence to detect bit errors and a simple 'stop-and-wait' method of acknowledgement and retransmission is provided for lost or corrupt packets.

In various protocol embodiments, the address mode bits 0-1 of the frame descriptor illustrated in FIG. 12 are used to describe the type of addressing used by a particular frame format. Examples of address modes, as illustrated in the frame description of FIG. 12, are provided in Table 5. Other protocol embodiments use a different number of bits, and other bit mapping and values.

TABLE 5

| Bit 1 | Bit 0 | Dest Address Type | Source Address Type | Number of Address Bytes |
|---|---|---|---|---|
| 0 | 0 | Short | Short | 2 |
| 0 | 1 | Long | Long | 10 |
| 1 | 0 | Short | None | 1 |
| 1 | 1 | Long | None | 5 |

In the illustrated example, only frames using address modes 00b and 01b are acknowledged automatically by the link layer protocol. If bit 1 is set no protocol acknowledgement will be forthcoming via the link layer.

In various protocol embodiments, the frame check sequence (FCS) Mode of the frame descriptor illustrated in FIG. 12 uses bits 2-3 to define the number of frame check sequence bytes used for error control within this frame. The FCS is calculated over the size byte thru the end of the payload (SDU). Various protocol embodiments define FCS modes as provided in Table 6. Other protocol embodiments use a different number of bits, and other bit mapping and values.

TABLE 6

| Bit 3 | Bit 2 | Number of FCS Bytes | Description |
|---|---|---|---|
| 0 | 0 | None | NA |
| 0 | 1 | 1 | CRC-8 |
| 1 | 0 | 2 | CRC-CCITT |
| 1 | 1 | 4 | CRC-32 |

FCS modes 01b, 10b and 11b are checked for errors using an appropriate frame check sequence method. FCS mode 00b is considered to be application specific; thus, the Link Layer protocol does not check for bit errors.

In various protocol embodiments, the protocol identifier of the frame descriptor illustrated in FIG. 12 uses bits 4-5 indicate pre-defined applications, or next protocol layers, to which a particular packet will be routed. Various embodiments define layers as provided in Table 7. Other protocol embodiments use a different number of bits, and other bit mapping and values to identify protocols.

TABLE 7

| Bit 5 | Bit 4 | Protocol |
|---|---|---|
| 0 | 0 | Acknowledge |
| 0 | 1 | Audio |
| 1 | 0 | Hearing Aid Data |
| 1 | 1 | Extended, see Extended Protocols |

Acknowledge (00b) indicates that this is an automatically generated link layer acknowledgement packet sent as a result of bits set in a received frame descriptor. Audio protocol (01b) indicates that the information includes audio data, and is destined for an audio application. Hearing aid data protocol (10b) indicates that the information is destined for hearing aid control operations, such as fitting. The 11b code indicates that the destination transfer protocol is not one of the 3 (00b, 01b, or 10b) pre-defined protocol types, and thus indicates that an additional extended protocol byte is included as part of the frame format for routing purposes.

In various protocol embodiments, the Ack flag bit of the frame descriptor illustrated in FIG. 12 indicates whether this frame should be acknowledged automatically by the link layer protocol. In some embodiments, for example, the frame is not acknowledged if the Ack flag bit is 0, is acknowledged if the Ack flag bit is 1 and if a FCS is included and no errors are detected, and is acknowledged if the Ack flag bit is 1 and if no FCS is included. In these embodiments, the address mode of the frame must be 00b or 01b, the address types for both the source and destination addresses must be unicast, and the protocol identifier of the frame is not 00b. In these embodiments, the acknowledgement frame must be sent using the same FCS mode and address mode of the frame being acknowledged. An acknowledgement message is used to indicate the successful reception of a message by the destination.

In various protocol embodiments, the version bit of the frame descriptor illustrated in FIG. 12 indicates the version of the frame format being received. In some embodiments, for example, the value of 0 for this bit represents the first version of the frame format, and the value of 1 for this bit is reserved for any future modifications to the frame format.

Referring again to the general link layer PDU format illustrated in FIG. 11, the illustrated address field format is dependent upon the "Address Mode" bits within the frame descriptor field. The address field contains a destination address and an optional source node address. In various embodiments, the extended protocol byte is only present if the protocol identifier bits in the frame descriptor byte are set to 11b. The extended protocol byte is a valid application/network service identifier which is used to route the received packet to the proper layer.

The frame check sequence (FCS) of the general link layer PDU format illustrated in FIG. 11 provides a means of bit error detection for each received frame. In various embodiments, the size of this field is variable and dependent on the FCS mode bits in the frame descriptor byte. In various embodiments, the FCS field is composed of one byte (8 bit), two bytes (16 bit), or four bytes (32 bit), and is included in the frame. If included, the FCS contains the cyclic-redundancy-check (CRC) value computed during transmission. The 32-bit FCS is based on the CRC-32 definition. The 16-bit FCS is based on the CRC-CCITT definition. The 8-bit FCS is based on the CRC-8 definition. No error correction is performed, only error detection. If an error is detected, the frame is not promoted to the next protocol level, and a Link Layer Acknowledgement packet is not generated. However, an audio streaming embodiment promotes the frame and the error flag to the next protocol level for error concealment purposes. The CRC calculation includes all data after the frame start flag through the end of the payload. and is performed before encoding at the source and after decoding at the destination.

In various embodiments, the 32-bit CRC-32 uses the following polynomial: $X^{32}+X^{26}+X^{23}+X^{22}+X^{16}+X^{12}+X^{11}+X^{10}+X^8+X^7+X^5+X^4+X^2+X+1$. The CRC value is initialized to 0xFFFFFFFF prior to computation. Other values can be used. The final computed value of the CRC is not modified by the transmitter or receiver, such as using a ones complemented value. The CRC, MSB thru the LSB, is placed into the transmitted data stream immediately prior to the Frame End Flag. The frame receiver computes the received FCS in the same manner as the transmitter and compares the computed FCS to the received FCS. If the two values match, the frame data was received correctly. The receiver performs a direct comparison of the computed and received CRC values.

In various embodiments, the 16-bit CRC-CCITT uses the polynomial: $X^{16}+X^{12}+X^5+1$. The CRC value is initialized to 0xFFFF prior to computation. The final computed value of the CRC is not modified by the transmitter or receiver, such as using a ones complemented value. The CRC, MSB first, and LSB second, is placed into the transmitted data stream immediately prior to the frame end flag. The frame receiver computes the received FCS in the same manner as the transmitter and compares the computed FCS to the received FCS. If the two values match, the frame data was received correctly. In various embodiments, the receiver performs a direct comparison of the computed and received CRC values, such that CRC magic numbers, such as 0x1D0F, are not used.

In various embodiments, the 8-bit CRC-8 definition uses the polynomial: $X^8+X^2+X+1$. The CRC value is initialized to 0xFF prior to computation. Other addresses can be used. The final computed value of the CRC is not be modified by the transmitter or receiver, such as using a ones complemented value. The single byte CRC value is placed into the transmitted data stream immediately prior to the Frame End Flag. The frame receiver computes the received FCS in the same manner as the transmitter and compares the computed FCS to the received FCS. If the two values match, the frame data was received correctly. The receiver performs a direct comparison of the computed and received CRC values.

Various protocol embodiments provide a process, via the implementation of an algorithm, to account for frame collisions. A node should not attempt to transmit frames if another node is in the process of transmitting a frame. If two nodes transmit concurrently the two transmissions will interfere, at least for nodes within the range of both transmitting nodes. If such a situation occurs a transmitting node becomes aware of the collision if the required ACK packet is not received. The acknowledgement packet may also be subject to interference, causing the original packet to be retransmitted and received multiple times.

FIG. 13 illustrates a process for transmitting a packet that accounts for frame collision, according to various embodiments of the present subject matter. At 1350, the node initiates a transmission request. The process proceeds to 1351, where the node determines whether the communication channel is free. If the communication channel is free, the process proceeds to 1352, where the node transmits a packet. If the communication channel is not free at 1351, the process proceeds to 1353, where it is determined whether a Carrier Sense Multiple Access (CSMA) counter is exceeded. The CSMA counter counts the number of times that a channel is sniffed. If the CSMA counter is exceeded, the process proceeds to 1354, where the packet transmission is abandoned. If the CSMA counter is not exceeded at 1353, the process proceeds to 1355, where the channel is sniffed until the channel is either free or a timeout occurs. If a timeout occurs, the packet transmission is abandoned 1354. If the channel is free, the process proceeds to 1356, and waits for a random timer event. When the event occurs, the process returns to determine whether the channel is still free 1351. The random access timer staggers the times that the various network nodes attempt to access the communication channel after the channel becomes free. In various protocol embodiments, each node implementing this algorithm has the ability to enable and disable the algorithm. The default/initial state is enabled.

Figure 14:
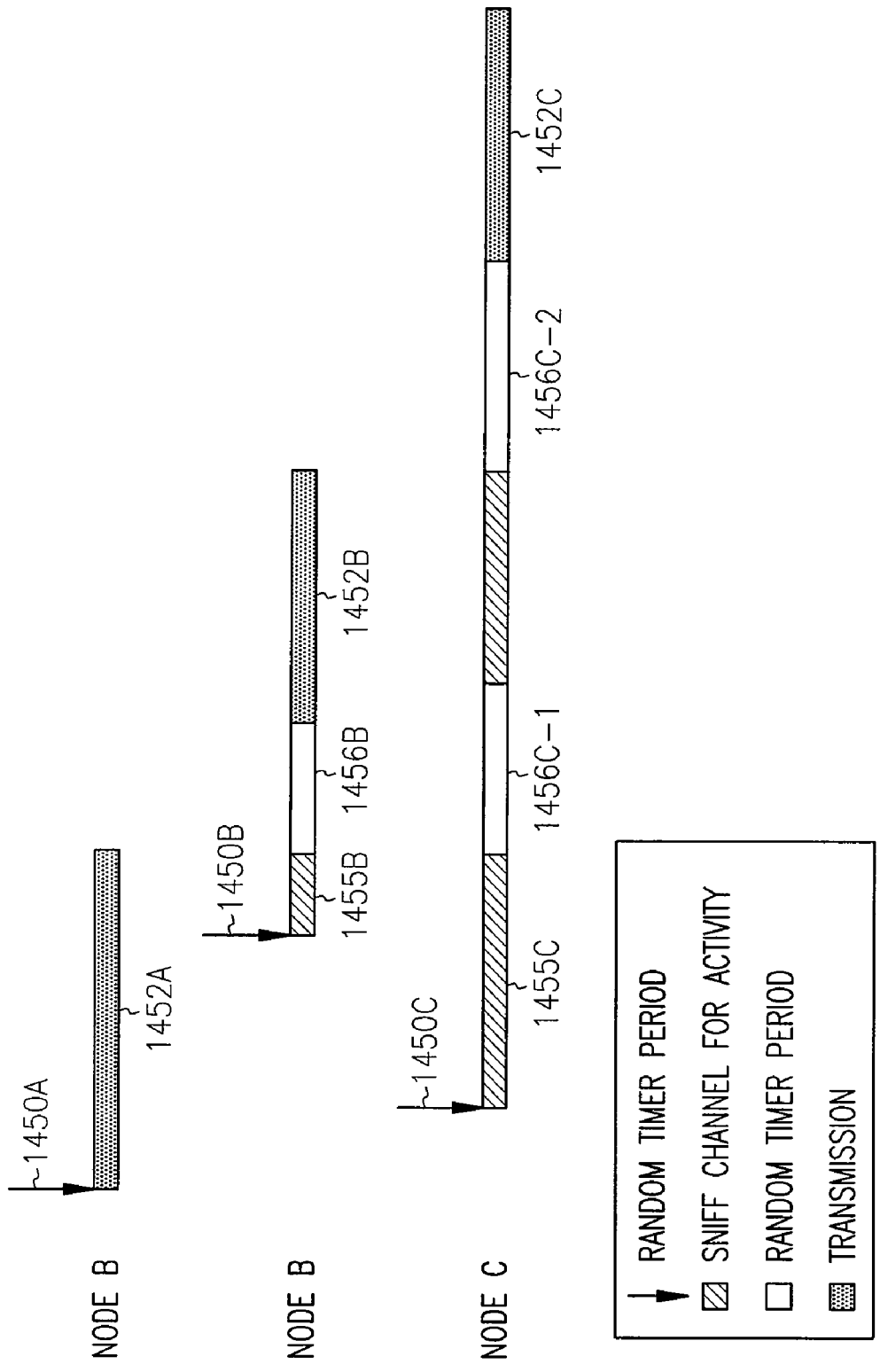
FIG. 14 illustrates a packet transmission example for three nodes, using the process illustrated in FIG. 13.

Table 8 provides frame collision parameters, according to various embodiments of the present subject matter. Other parameters can be used.

trated at 1356 in FIG. 13) before determining if the channel is free, and when a node transmits a packet over the channel (such as is illustrated at 1352 in FIG. 13). In FIG. 14, Node A is the first node to initiate a transmission request 1450A. Nodes B and C subsequently make transmission requests 1450B and 1450C when the channel is busy. Node A determines that the channel is free, and transmits a packet, as illustrated at 1452A. Node C, and then Node B, initiate transmission requests 1450C and 1450B and sniff 1455C and 1455B for channel activity while Node A is transmitting. After Node A is finished transmitting, Node B waits a random timer period 1456B and Node C waits a random timer period 1456C-1. In the illustrated example, Node B has a shorter random timer period than Node C, such that Node B checks for a free channel before Node C, and upon finding a free channel, begins transmitting 1452B before Node C checks the channel if it is free. After Node B finishes transmitting 1452B, Node C waits another random timer period 1456C-2 before checking if the channel is still free. Upon finding that the channel is still free, Node C transmits its packet 1452C.

The physical location and/or signal strength of different nodes can lead to situations where transmitting nodes are not visible to all nodes, which can lead to situations where two nodes transmit at the same time and corrupt packets at the receiver. This situation is handled by packet retransmission. In various embodiments, the network architecture uses error detection and retransmission to provide the successful transmission of a packet. For packets which require an acknowledgement, the acknowledgement packet is received within the 'Ack Wait Timer' period. If the acknowledgement packet

TABLE 8

| Parameter name | Description | Range/Value |
| --- | --- | --- |
| Random Timer | The 'random' time period to wait before re-checking the channel for activity and deciding whether to transmit. | The duration of the timer is a randomly picked value from the following set: {100, 200, 300, . . . 1400, 1500, 1600} μSecs |
| CSMA counter | The number of times sniffing for a free channel is invoked. | {0, 1, 2, . . . , 7} |
| Sniff timer | The time period used to abandon channel sniffing in case of distortion or audio streaming. | 40 mSecs, as determined by rounding up the amount of time it takes a node to transmit the largest size packet allowed using Manchester encoding. |

FIG. 14 illustrates a packet transmission example for three nodes, using the process illustrated in FIG. 13. The three network nodes are illustrated as Node A, Node B, and Node C. A legend is provided in FIG. 14 to assist the reader with identifying when a node makes a transmission request (such as illustrated at 1350 in FIG. 13, when the node is sniffing the channel for activity (such as illustrated at 1355 in FIG. 13, when a node waits for a random timer period (such as illusis not timely received, the original packet is retransmitted. The maximum number of times a packet is retransmitted is limited to a 'Max Number of Retransmissions.' The duplicate delivery of a message to a node under fault conditions that require a packet to be retransmitted are possible. Table 9 provides retransmission parameters, according to various embodiments of the present subject matter. Other parameter values can be used.

TABLE 9

| Parameter name | Description | Range |
| --- | --- | --- |
| Ack Wait Timer | The period to wait before a packet is retransmitted. | ≦300 mSecs NOTE: The upper bound on this range was calculated by rounding up the worst case time for a packet to complete the transmission algorithm. By using the worst case time for the transmission algorithm we are attempting to avoid unnecessary retransmissions of a message. |

TABLE 9-continued

| Parameter name | Description | Range |
|---|---|---|
| Max Number of Retransmissions | The maximum number of times a packet is retransmitted, in case an ACK is required but not received. | {0, 1, 2, ..., 7} |

According to various protocol embodiments, when a node receives a valid inbound PDU that has a broadcast address as the destination address and when the node is suppose to send a response, each individual node delays their response in order to avoid frame collisions. This delay value functions as a back off mechanism to prevent all nodes that received the broadcast message from transmitting their response at the same time and causing frame collisions. In various embodiments, the delay value is a randomly picked value from the 'Random Timer' set multiplied by ten, which provides a back off range of 1-16 milliseconds. The back off mechanism is implemented to reduce the chances that a node will have to execute several iterations of the transmission algorithm. This reduces the count of the CSMA counter in the transmission algorithm illustrated in FIG. 13, which can be particularly beneficial if the CSMA counter is set to a low value.

Higher Level Protocols (Layer 3)

Higher level protocols, such as illustrated as Layer 3 in FIG. 6, include, but are not necessarily limited to, (A) data transfer protocol, (B) audio transfer protocol, and (C) extended protocol. The data transfer protocol is used to communicate with hearing instruments relative to control and configuration operations, such as fitting functions. The audio transfer protocol is used to transmit digital audio data to hearing instruments. The extended protocol is used to provide access to additional network service protocols, such that additional network services are allowed to use the data link and physical layers of the wireless protocol for communication.

(A) Hearing Aid Data Transfer Protocol

The hearing aid data transfer protocol is used to communicate programming information used by a fitting application, manufacturing applications, and/or other similar type applications.

FIG. 15 illustrates an example of a PDU frame format for use by a Programmer to communicate data to a hearing aid, according to various embodiments of the present subject matter. Table 10 provides further information for the data illustrated in the PDU frame format example illustrated in FIG. 15. Various protocol embodiments use other formats.

TABLE 10

| Size: | 0x10 |
|---|---|
| Frame Descriptor: | Bit 7: Version Indication = 0 |
| | Bit 6: Ack Flag = 1, Acknowledge the frame to insure data integrity |
| | Bits 5-4: Protocol Identifier = 10b, Hearing Aid Data |
| | Bits 3-2: FCS Mode = 11b, 4 byte CRC |
| | Bits 1-0: Address Mode = 01b, Long address with source and destination device ID's, 10 bytes |
| Address: | Destination Vendor = 0x04, Starkey |
| | Destination Device ID = 0x11223344, Address of the hearing aid of interest |
| | Source Vendor = 0x04, Starkey |
| | Source Device ID = 0x12345678, Address of the Programmer |

TABLE 10-continued

| Hearing Aid Data: | 0xAABBCCDDEE (Vendor dependent data) |
|---|---|
| Frame Check Sequence: | 0xC9DAA99D (32 bit CRC) |

FIG. 16 illustrates an example of a Layer 2 acknowledgement packet returned by the destination, according to various embodiments of the present subject matter. Table 11 provides further information for the data illustrated in the acknowledgement packet example illustrated in FIG. 16. Various protocol embodiments use other formats.

TABLE 11

| Size: | 0x0B |
|---|---|
| Frame Descriptor: | Bit 7: Version Indication = 0 |
| | Bit 6: Ack Flag = 0, Do not acknowledge this packet |
| | Bits 5-4: Protocol Identifier = 00b, ACK packet identifier |
| | Bits 3-2: FCS Mode = 11b, 4 byte CRC |
| | Bits 1-0: Address Mode = 01b, Always the same as the received packet being acknowledged |
| Address: | Same format as the received packet with the Source Device ID and the Destination Device ID reversed. |
| | Destination Vendor = 0x04, Starkey |
| | Destination Device ID = 0x12345678, Address of the packet transmitter |
| | Source Vendor = 0x04, Starkey |
| | Source Device ID = 0x11223344, Address of the packet receiver |
| Frame Check Sequence: | 0xC0599A9C (32 bit CRC) |

(B) Audio Transfer Protocol

The audio transfer protocol is used to transmit digital audio information. One of the short addressing modes is used to increase the payload transfer rate of the audio data.

FIG. 17 illustrates an audio transfer payload, according to various embodiments of the present subject matter. The illustrated payload includes four fields, including audio descriptor, embedded data size, audio codec data, and embedded data fields. Various protocols use other field sizes and data sequences. The audio transfer protocol is capable of multiplexing audio and data in the same packet such that the quality of the audio can be controlled. Thus, a data transmission request may require that a lower quality audio stream be inserted into the next packet to make room for the data payload.

FIG. 18 illustrates an audio descriptor field for the audio transfer payload of FIG. 17, according to various embodiments of the present subject matter. The illustrated audio descriptor field is an 8-bit value, where bit 7 provides the embedded data field, bit 6 provides the embedded data protocol identifier, and bits 5-0 provide the audio codec. Various embodiments use other formats.

Table 12 illustrates an embedded data field for the audio descriptor field of FIG. 18, according to various embodiments of the present subject matter. The embedded data field is used to indicate the presence of data in the audio stream.

TABLE 12

| Bit 7 | Description |
|---|---|
| 0 | No Data Present |
| 1 | Data Present |

Table 13 illustrates an embedded data protocol identifier for the audio descriptor field of FIG. 18, according to various embodiments of the present subject matter. The embedded data protocol identifier is used to indicate the format of the embedded data within the message. Various embodiments use other formats.

TABLE 13

| Bit 6 | Description |
|---|---|
| 0 | Hearing Aid Data Protocol |
| 1 | Extended Protocol |

Table 14 illustrates an audio codec for the audio descriptor field of FIG. 18, according to various embodiments of the present subject matter. The audio codec defines the codec used to encode the stream. Various embodiments use other formats.

TABLE 14

| Bit 5 | Bit 4 | Bit 3 | Bit 2 | Bit 1 | Bit 0 | Description |
|---|---|---|---|---|---|---|
| 0 | 0 | 0 | 0 | 0 | 0 | PCM |
| 0 | 0 | 0 | 0 | 0 | 1 | G.711 |
| 0 | 0 | 0 | 0 | 1 | 0 | G.722 |
| 0 | 0 | 0 | 0 | 1 | 1 | G.726 |
|   |   |   |   |   |   | 0x04-0x3E Reserved |
| 1 | 1 | 1 | 1 | 1 | 1 | Stream undefined for Codec |

The six-bit value for the audio codec provides space for assigning coding types for other coding algorithms. Various embodiments use other formats, including number of bits, values, and bit mapping to values.

In various audio transfer protocol embodiments, the embedded data size field of the audio transfer payload, such as illustrated in FIG. 17, is an 8-bit value that indicates the number of bytes of data in the embedded data field, and that has valid range for this field is from 1 to 251. This field is present if there is at least 1 byte of embedded data. The maximum value can be obtained if the complete audio payload is replaced by embedded data.

In various audio transfer protocol embodiments, the audio codec data field of the audio transfer payload illustrated in FIG. 17 is passed to the specified codec and contains all information for correct decoding. The frame format of some codec such as MPEG audio can be directly inserted where the frame format contains the necessary header information and error control. Other codec like G.722 are sample-based and some system specific information is transmitted together with the encoded bit stream. In this case a frame format must be specified.

In various audio transfer protocol embodiments, the embedded data field of the audio transfer payload illustrated in FIG. 17 includes data that is either hearing aid data or extended protocol data. If the data is extended protocol data, an additional extended protocol byte is included as part of the data for routing purposes.

FIG. 19 illustrates a PDU format for an audio transfer protocol, according to various embodiments. Table 15 provides further information for the data illustrated in the PDU format for the audio transfer protocol, as illustrated in FIG. 19. Various embodiments use other formats, including other number of bits, values, bit mapping to the values and/or data sequences.

TABLE 15

| | |
|---|---|
| Size: | Indicates the number of bytes following, which is dependent on the payload size |
| Frame Descriptor: | Bit 7: Version Indication = 0 |
| | Bit 6: Ack Flag = 0, Do not acknowledge this packet |
| | Bits 5-4: Protocol Identifier = 01b, Audio |
| | Bits 3-2: FCS Mode = 00b, No FCS |
| | Bits 1-0: Address Mode = 10b, Short destination address only |
| Address: | 0x6D, Vendor specific value |
| Audio Descriptor Header: | Bit 7: 0, No Data Present |
| | Bit 6: NA |
| | Bits 5-0: 0x2, G722 Codec |
| Audio Codec Header: | Bits 7: Single Channel |
| | Bits 6-3: 0x5, 16 KHz Sampling Frequency |
| | Bits 2-1: 0x3, Mode 3 - 3 bits/sample |
| | Bit 0: Do Nothing |
| Audio Codewords: | Vendor specific values |

FIG. 20 illustrates a G.722 Audio Codec Data frame format, according to various embodiments of the present subject matter. The illustrated frame format includes fields for an audio header and data values. FIG. 21 illustrates the audio header for the frame format illustrated in FIG. 20, according to various embodiments. The illustrated audio header is an 8-bit value with a one-bit multi-channel mode field, a four-bit sampling frequency field, a two-bit bit-rate mode field, and a one-bit reset field. Various embodiments use other formats.

Table 16 provides further information for the reset field for the audio header illustrated in FIG. 21, according to various embodiments. Other embodiments have other formats. The reset field is used to initialize the compression algorithm.

TABLE 16

| Bit 0 | Description |
|---|---|
| 0 | Do nothing |
| 1 | Reset algorithm |

Table 17 provides further information for the bit rate mode field for the audio header illustrated in FIG. 21, according to various embodiments. The modes of operation corresponding to four different bit rates. Other embodiments have other formats, including data values for the modes and bit mapping to the values.

TABLE 17

| Bit 2 | Bit 1 | Description |
|---|---|---|
| 0 | 0 | Mode 0 = 2 bits/sample |
| 0 | 1 | Mode 1 = 4 bits/sample |
| 1 | 0 | Mode 2 = 3.5 bits/sample |
| 1 | 1 | Mode 3 = 3 bits/sample |

Table 18 provides further information for the sampling frequency field for the audio header illustrated in FIG. 21, according to various embodiments. Various embodiments use other formats, including data values for the frequencies and bit mapping to the data values. The sampling frequency field are used to indicate the sampling rate.

TABLE 18

| Bit 6 | Bit 5 | Bit 4 | Bit 3 | Description |
|---|---|---|---|---|
| 0 | 0 | 0 | 0 | 8 KHz |
| 0 | 0 | 0 | 1 | 10 KHz |
| 0 | 0 | 1 | 0 | 12 KHz |
| 0 | 0 | 1 | 1 | 14 KHz |
| 0 | 1 | 0 | 0 | 15 KHz |
| 0 | 1 | 0 | 1 | 16 KHz |
| 0 | 1 | 1 | 0 | 18 KHz |
| 0 | 1 | 1 | 1 | 20 KHz |
| 1 | 0 | 0 | 0 | 22.05 KHz |
| 1 | 0 | 0 | 1 | 24 KHz |
| 1 | 0 | 1 | 0 | 26 KHz |
| 1 | 0 | 1 | 1 | 28 KHz |
| 1 | 1 | 0 | 0 | 30 KHz |
| 1 | 1 | 0 | 1 | 32 KHz |
| 1 | 1 | 1 | 0 | 44.1 KHz |
| 1 | 1 | 1 | 1 | 48 KHz |

Table 19 provides further information for the multi-channel mode field for the audio header illustrated in FIG. 21, according to various embodiments. Various embodiments use other formats.

TABLE 19

| Bit 7 | Description |
|---|---|
| 0 | Single Channel |
| 1 | Dual Channel |

In dual channel mode, left and right channel samples are interleaved with left channel first. Only the bit rate mode is part of the G.722 standard. Using a sampling rate other than 16 kHz and more than one channel extends flexibility. No error control has been specified since all data values are equally important, so the CRC check in the link protocol can be used.

(C) Extended Protocol

Figure 22:
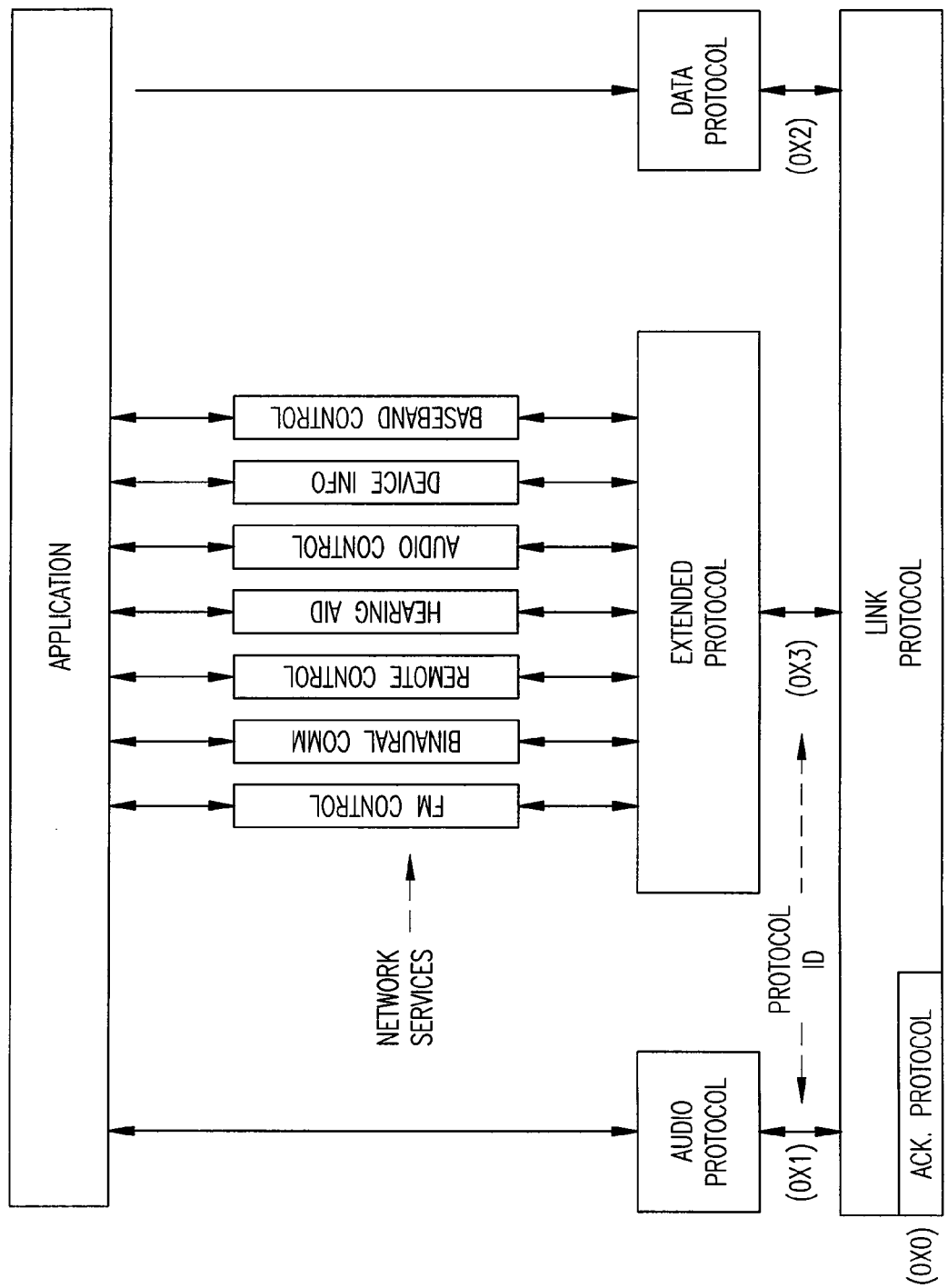
FIG. 22 illustrates a network services structure, according to various embodiments of the present subject matter.

FIG. 22 illustrates a network services structure, according to various embodiments of the present subject matter. The illustration includes a link protocol functioning as a Layer 2 protocol, an application protocol functioning as a Layer 4 protocol, and audio and data protocols functioning as Layer 3 protocols between the link and application protocols. The illustration further includes an extended protocol functioning as a Layer 3 protocol to provide support to network services such as baseband control, device information, audio control, hearing aid, remote control, binaural communication, FM control and the like. The values in parentheses are protocol identifiers, such are provided by the protocol identifiers listed in Table 7 for the frame descriptor illustrated in FIG. 12.

Table 20 illustrates a list of network service identifiers, which are also illustrated in FIG. 22, according to various embodiments. Network service identifiers 0 and 255 are reserved values. Various embodiments use other formats to identify various network services.

TABLE 20

| Port | Network Service |
|---|---|
| 0x00 | Reserved |
| 0x01 | Baseband Control |
| 0x02 | Device Information |
| 0x03 | Audio Control |
| 0x04 | Hearing Aid Control |

TABLE 20-continued

| Port | Network Service |
|---|---|
| 0x05 | Remote Control |
| 0x06 | Binaural Communication |
| 0x07 | FM Control |
| 0x08-0xFE | Reserved |
| 0xFF | Reserved |

The baseband control network service allows the assigning and un-assigning of addresses to a wireless node. The baseband control network service is used to change the channel encoding technique used by a wireless node and to regulate the power consumption of a wireless node. Table 21 lists service requests and responses supported by the baseband control network service, according to various embodiments. Various embodiments use other formats.

TABLE 21

| PDU Description | Length (bytes) | Opcode (byte) | Contents | Position in payload |
|---|---|---|---|---|
| Accept | 1 | 0x01 | — | |
| Reject | 1 | 0x02 | — | |
| Long Address Assign | 6 | 0x03 | Vendor ID | 2 |
| | | | Device ID | 3-6 |
| Long Address Un-assign | 6 | 0x04 | Vendor ID | 2 |
| | | | Device ID | 3-6 |
| Short Address Assign | 2 | 0x05 | Short address | 2 |
| Short Address Un-assign | 2 | 0x06 | Short address | 2 |
| 8B10B | 1 | 0x07 | — | |
| Manchester | 1 | 0x08 | — | |
| Power Down | 1 | 0x09 | — | |
| Power Up | 1 | 0x0A | — | |

All baseband requests and responses use the long address mode with both a source and destination address (address mode 0x01). Baseband control requests that have not used address mode (0x01) are ignored/discarded. Baseband control node requests and responses use unicast addresses. Received baseband control requests with a broadcast or multicast long address in either the source or destination address are ignored/discarded. All baseband requests and responses are sent with the strongest frame check sequence mechanism defined (FCS mode 0x11) by the protocol. Since all the baseband requests require a specific baseband response, all requests and responses are sent without requiring a link layer acknowledgement. Due to the wireless protocol and correlating baseband control requests/responses, only a single baseband control operation is performed at a time between any pair of wireless nodes.

FIG. 23 illustrates a PDU format for a long address assign/un-assign request, according to various embodiments of the present subject matter. Table 22 provides further information for the long address assign/un-assign request illustrated in FIG. 23, according to various embodiments. Various embodiments use other formats.

TABLE 22

| | |
|---|---|
| Size: | 0x12 |
| Frame Descriptor: | Bit 7: Version Indication = 0 |
| | Bit 6: Ack Flag = 0, No data link layer acknowledgement |
| | Bits 5-4: Protocol Identifier = 11b, Extended Protocol |
| | Bits 3-2: FCS Mode = 11b, 4 byte CRC |
| | Bits 1-0: Address Mode = 01b, Long address with source and destination |

TABLE 22-continued

| | |
|---|---|
| Address: | Destination Vendor = 0xAA, Vendor specific value |
| | Destination Device ID = 0xBBBBBBBB, Vendor specific value |
| | Source Vendor = 0xCC, Vendor specific value |
| | Source Device ID = 0xDDDDDDDD, Vendor specific value |
| Network Service ID: | 0x01, Baseband Control Network Service |
| Request Opcode: | 0x03 Long Address Assign or 0x04 Long Address Un-assign |
| Vendor ID: | 0xEE, Vendor specific value |
| Device ID: | 0xFFFFFFFF, Vendor specific value |

FIG. 24 illustrates a PDU format for an accept or reject response, according to various embodiments of the present subject matter. Table 23 provides further information for the accept or reject response illustrated in FIG. 24, according to various embodiments. Various embodiments use other formats.

TABLE 23

| | |
|---|---|
| Size: | 0x0D |
| Frame Descriptor: | Bit 7: Version Indication = 0 |
| | Bit 6: Ack Flag = 0, No data link layer acknowledgement |
| | Bits 5-4: Protocol Identifier = 11b, Extended Protocol |
| | Bits 3-2: FCS Mode = 11b, 4 byte CRC |
| | Bits 1-0: Address Mode = 01b, Long address with source and destination device ID's |
| Address: | Destination Vendor = 0xCC, Vendor specific value |
| | Destination Device ID = 0xDDDDDDDD, Vendor specific value |
| | Source Vendor = 0xAA, Vendor specific value |
| | Source Device ID = 0xBBBBBBBB, Vendor specific value |
| Network Service ID: | 0x01, Baseband Control Network Service |
| Response Opcode: | 0x01 Accept Response OR 0x02 Reject Response |

FIG. 25 illustrates a PDU format for a short address assign/un-assign request, according to various embodiments of the present subject matter. Table 24 provides further information for the short address assign/un-assign request illustrated in FIG. 25, according to various embodiments. Various embodiments use other formats.

TABLE 24

| | |
|---|---|
| Size: | 0x0E |
| Frame Descriptor | Bit 7: Version Indication = 0 |
| | Bit 6: Ack Flag = 0, No data link layer acknowledgement |
| | Bits 5-4: Protocol Identifier = 11b, Extended Protocol |
| | Bits 3-2: FCS Mode = 11b, 4 byte CRC |
| | Bits 1-0: Address Mode = 01b, Long address with source and destination device ID's |
| Address | Destination Vendor = 0xAA, Vendor specific value |
| | Destination Device ID = BBBBBBBB, Vendor specific value |
| | Source Vendor = 0xCC, Vendor specific value |
| | Source Device ID = 0xDDDDDDDD, Vendor specific value |
| Network Service ID: | 0x01, Baseband Control Network Service |
| Request Opcode: | 0x04, Short Address Assign or 0x05, Short Address Un-assign |
| Short Address: | 0xFF, Vendor specific value |

FIG. 26 illustrates a PDU format for an accept or reject response, according to various embodiments of the present subject matter. Table 25 provides further information for the accept or reject response illustrated in FIG. 26, according to various embodiments. Various embodiments use other formats.

TABLE 25

| | |
|---|---|
| Size: | 0x0D |
| Frame Descriptor: | Bit 7: Version Indication = 0 |
| | Bit 6: Ack Flag = 0, No data link layer acknowledgement |
| | Bits 5-4: Protocol Identifier = 11b, Extended Protocol |
| | Bits 3-2: FCS Mode = 11b, 4 byte CRC |
| | Bits 1-0: Address Mode = 01b, Long address with source and destination device ID's |
| Address: | Destination Vendor = 0xCC, Vendor specific value |
| | Destination Device ID = 0xDDDDDDDD, Vendor specific value |
| | Source Vendor = 0xAA, Vendor specific value |
| | Source Device ID = 0xBBBBBBBB, Vendor specific value |
| Network Service ID: | 0x01, Baseband Control Network Service |
| Response Opcode: | 0x01, Accept Response OR 0x02, Reject Response |

FIG. 27 illustrates a PDU format for a 8B10B/Manchester request, according to various embodiments of the present subject matter. Table 26 provides further information for the 8B10B/Manchester request illustrated in FIG. 27, according to various embodiments. Various embodiments use other formats.

TABLE 26

| | |
|---|---|
| Size: | 0x0E |
| Frame Descriptor: | Bit 7: Version Indication = 0 |
| | Bit 6: Ack Flag = 0, No data link layer acknowledgement |
| | Bits 5-4: Protocol Identifier = 11b, Extended Protocol |
| | Bits 3-2: FCS Mode = 11b, 4 byte CRC |
| | Bits 1-0: Address Mode = 01b, Long address with source and destination device ID's |
| Address: | Destination Vendor = 0xAA, Vendor specific value |
| | Destination Device ID = BBBBBBBB, Vendor specific value |
| | Source Vendor = 0xCC, Vendor specific value |
| | Source Device ID = 0xDDDDDDDD, Vendor specific value |
| Network Service ID: | 0x01, Baseband Control Network Service |
| Request Opcode: | 0x07 8B10B Request or 0x08 Manchester Request |

FIG. 28 illustrates a PDU format for an accept or reject response, according to various embodiments of the present subject matter. Table 27 provides further information for the accept or reject response illustrated in FIG. 28, according to various embodiments.

TABLE 27

| | |
|---|---|
| Size: | 0x0D |
| Frame Descriptor: | Bit 7: Version Indication = 0 |
| | Bit 6: Ack Flag = 0, No data link layer acknowledgement |
| | Bits 5-4: Protocol Identifier = 11b, Extended Protocol |
| | Bits 3-2: FCS Mode = 11b, 4 byte CRC |
| | Bits 1-0: Address Mode = 01b, Long address with source and destination device ID's |

TABLE 27-continued

| | |
|---|---|
| Address: | Destination Vendor = 0xCC, Vendor specific value |
| | Destination Device ID = 0xDDDDDDDD, Vendor specific value |
| | Source Vendor = 0xAA, Vendor specific value |
| | Source Device ID = 0xBBBBBBBB, Vendor specific value |
| Network Service ID: | 0x01, Baseband Control Network Service |
| Response Opcode: | 0x01 Accept OR 0x02 Reject |

FIG. 29 illustrates a PDU format for a power down/up request, according to various embodiments of the present subject matter. Table 28 provides further information for the power down/up request illustrated in FIG. 29, according to various embodiments. Various embodiments use other formats.

TABLE 28

| | |
|---|---|
| Size: | 0x0E |
| Frame Descriptor: | Bit 7: Version Indication = 0 |
| | Bit 6: Ack Flag = 0, No data link layer acknowledgement |
| | Bits 5-4: Protocol Identifier = 11b, Extended Protocol |
| | Bits 3-2: FCS Mode = 11b, 4 byte CRC |
| | Bits 1-0: Address Mode = 01b, Long address with source and destination device ID's |
| Address: | Destination Vendor = 0xAA, Vendor specific value |
| | Destination Device ID = BBBBBBBB, Vendor specific value |
| | Source Vendor = 0xCC, Vendor specific value |
| | Source Device ID = 0xDDDDDDDD, Vendor specific value |
| Network Service ID: | 0x01, Baseband Control Network Service |
| Request Opcode: | 0x09 Power Down Request or 0x0A Power Up Request |

FIG. 30 illustrates a PDU format for an accept or reject response, according to various embodiments of the present subject matter. Table 29 provides further information for the accept or reject response illustrated in FIG. 30, according to various embodiments. Various embodiments use other formats.

TABLE 29

| | |
|---|---|
| Size: | 0x0D |
| Frame Descriptor: | Bit 7: Version Indication = 0 |
| | Bit 6: Ack Flag = 0, No data link layer acknowledgement |
| | Bits 5-4: Protocol Identifier = 11b, Extended Protocol |
| | Bits 3-2: FCS Mode = 11b, 4 byte CRC |
| | Bits 1-0: Address Mode = 01b, Long address with source and destination device ID's |
| Address: | Destination Vendor = 0xCC, Vendor specific value |
| | Destination Device ID = 0xDDDDDDDD, Vendor specific value |
| | Source Vendor = 0xAA, Vendor specific value |
| | Source Device ID = 0xBBBBBBBB, Vendor specific value |
| Network Service ID: | 0x01, Baseband Control Network Service |
| Response Opcode: | 0x01 Accept OR 0x02 Reject |

The device info network service allows for wireless node discovery and wireless node information retrieval. Table 30 lists the service requests and responses supported by the device info network service, according to various embodiments. Various embodiments use other formats.

TABLE 30

| PDU Description | Length (bytes) | Opcode (byte) | Contents | Position in Payload |
|---|---|---|---|---|
| Ping | 1 | 0x01 | — | |
| Ping for a left HA | 1 | 0x02 | — | |
| Ping for a right HA | 1 | 0x03 | — | |
| Ping reply | 1 | 0x04 | — | |
| Ping reply from a left HA | 1 | 0x05 | — | |
| Ping reply from a right HA | 1 | 0x06 | — | |
| Address Info Request | 1 | 0x07 | — | |
| Address Info Reply | 2 + (5 * long count) + (1 * short count) | 0x08 | Long Addr Count | 2 |
| | | | Short Addr Count | 3 |
| | | | Long Addresses | 4 |
| | | | Short Addresses | 4 + (Long Addr Count * 5) |
| Extended device information request | 1 | 0x09 | — | |
| Extended device information reply | 23 | 0x0a | Device ID | 2 |
| | | | Device Model | 3-10 |
| | | | Device Serial Number | 11-18 |
| | | | Device Side | 19 |
| | | | Link Version | 20 |
| | | | Link MTU | 21 |
| | | | Link Options | 22 |
| | | | Link Audio | 23 |
| Audio Info Request | 1 | 0x0b | — | |
| Audio Info Reply | 2 + (Stream Count * 2) | 0x0c | Stream Count | 2 |
| | | | List of [Stream Id, Frequency] pairs | 3 – (Length) |

The ping requests and responses (opcodes 0x01-0x06) are used to obtain the primary long address of nodes within range. The left and right versions are used to request addresses of left and right assigned nodes, respectively. Thus, if a node is defined as left, then it must use the 'Ping Reply from a left HA' (0x05) response to both the Ping (0x01) and 'Ping for a left HA' (0x02) request, and it must not respond to the 'Ping for a right HA' (0x03) request. Nodes that do not have left or right assignments must respond with a 'Ping Reply' (0x04) response. The remaining requests and responses are used to retrieve additional information from a wireless node.

All device info requests use the long address mode with both a source and destination address (addressing mode 0x01). Device info requests that have not used addressing mode (0x01) are ignored/discarded. Device info ping requests can use the broadcast address as the destination address. Device info ping responses and all other device info requests and responses use a unicast address for both the source and destination addresses; otherwise, they are ignored/discarded. All device info requests and responses are sent with the strongest frame check sequence mechanism defined (FCS mode 0x11) by the protocol. Since all the device info requests require a specific device info response, all requests and responses are sent without requiring a link layer acknowledgement. Due to the wireless protocol and correlating device info control requests/responses, only a single device info control operation is performed at a time between wireless nodes.

FIG. 31 illustrates a PDU format for a ping request, according to various embodiments of the present subject matter. Table 31 provides further information for the ping request illustrated in FIG. 31, according to various embodiments. Various embodiments use other formats.

TABLE 31

| Size: | Indicates that there are 13 bytes following |
|---|---|
| Frame Descriptor: | Bit 7: Version = 0 |
| | Bit 6: Ack Flag = 0, No data link layer acknowledgement |
| | Bits 5-4: Protocol Identifier = 11b, Extended Protocol |
| | Bits 3-2: FCS Mode = 11b, 4 byte CRC |
| | Bits 1-0: Address Mode = 01b, Long address with source and destination |
| Address: | Destination Vendor = 0xAA, Vendor specific value |
| | Destination Device ID = 0xFFFFFFFF, Broadcast address |
| | Source Vendor = 0xCC, Vendor specific value |
| | Source Device ID = 0xDDDDDDDD, Unique vendor specific value |
| Network Service ID: | 0x02, Device Info Network Service |
| Request Opcode: | 0x01 Ping, 0x02 Ping for a Left HA, or 0x03 Ping for a Right HA |

FIG. 32 illustrates a PDU format for a ping response, according to various embodiments of the present subject matter. Table 32 provides further information for the ping response illustrated in FIG. 32, according to various embodiments. Various embodiments use other formats.

TABLE 32

| Size: | Indicates that there are 13 bytes following |
|---|---|
| Frame Descriptor: | Bit 7: Version = 0 |
| | Bit 6: Ack Flag = 0, No data link layer acknowledgement |
| | Bits 5-4: Protocol Identifier = 11b, Extended Protocol |
| | Bits 3-2: FCS Mode = 11b, 4 byte CRC |
| | Bits 1-0: Address Mode = 01b, Long address with source and destination |
| Address: | Destination Vendor = 0xCC, Same value as in the request Source Vendor |
| | Destination Device ID = 0xDDDDDDDD, Same value as in the request Source Device ID |
| | Source Vendor = 0xAA, Vendor specific value |
| | Source Device ID = 0xBBBBBBBB, Unique vendor specific value |
| Network Service ID: | 0x02, Device Info Network Service |
| Response Opcode: | 0x04 Ping reply, 0x05 Ping reply from a Left HA, or 0x06 Ping reply for a right HA |

FIG. 33 illustrates a PDU format for an address info request, according to various embodiments of the present subject matter. Table 33 provides further information for the address info request illustrated in FIG. 33, according to various embodiments. Various embodiments use other formats.

TABLE 33

| Size: | Indicates that there are 13 bytes following |
|---|---|
| Frame Descriptor: | Bit 7: Version = 0 |
| | Bit 6: Ack Flag = 0, No data link layer acknowledgement |
| | Bits 5-4: Protocol Identifier = 11b, Extended Protocol |
| | Bits 3-2: FCS Mode = 11b, 4 byte CRC |
| | Bits 1-0: Address Mode = 01b, Long address with source and destination |
| Address: | Destination Vendor = 0xAA, Vendor specific value |
| | Destination Device ID = 0xBBBBBBBB, Unique vendor specific value |
| | Source Vendor = 0xCC, Vendor specific value |
| | Source Device ID = 0xDDDDDDDD, Unique vendor specific value |
| Network Service ID: | 0x02, Device Info Network Service |
| Request Opcode: | 0x07 Address Info Request |

Address Info response PDUs have a variable size depending on how many long and short addresses are configured for a node. The minimum size of a response is 0x14. This includes the long and short address count fields as well as the one long address that all nodes must have configured. Table 34 illustrate a format for the Address Info Data, according to various embodiments. Various embodiments use other formats.

TABLE 34

| | Long Address Count | Short Address Count | Long Addresses | Short Addresses |
|---|---|---|---|---|
| Value | >=1 | >=0 | 0xAABBBBBBBB | 0xYY |
| Description | The number of long addresses configured on this device | The number of short address configured on this device | The list of long address; size is Long Count * Size of Long Address | The list of short addresses; size is Short Count * Size of Short Address |

FIG. 34 illustrates a PDU format for an address info response, according to various embodiments of the present subject matter. Table 35 provides further information for the address info response illustrated in FIG. 34, according to various embodiments. Various embodiments use other formats.

TABLE 35

| | |
|---|---|
| Size: | Indicates that there are 21 bytes following |
| Frame Descriptor: | Bit 7: Version = 0 |
| | Bit 6: Ack Flag = 0, No data link layer acknowledgement |
| | Bits 5-4: Protocol Identifier = 11b, Extended Protocol |
| | Bits 3-2: FCS Mode = 11b, 4 byte CRC |
| | Bits 1-0: Address Mode = 01b, Long address with source and destination |
| Address: | Destination Vendor = 0xCC, Same value as in the request Source Vendor |
| | Destination Device ID = 0xDDDDDDDD, Same value as in the request Source Device ID |
| | Source Vendor = 0xAA, Vendor specific value |
| | Source Device ID = 0xBBBBBBBB, Unique vendor specific value |
| Network Service ID: | 0x02, Device Info Network Service |
| Response Opcode: | 0x08 Address Info Reply |
| Addr Info Data: | 0x0101AABBBBBBBB69 - address info for this node |

Extended Device Information provides a way to retrieve identifying information about a node. Request PDUs are fixed in size. FIG. 35 illustrates a PDU format for an address info request, according to various embodiments of the present subject matter. Table 36 provides further information for the address info request illustrated in FIG. 35, according to various embodiments. Various embodiments use other formats.

TABLE 36

| | |
|---|---|
| Size: | Indicates that there are 13 bytes following |
| Frame Descriptor: | Bit 7: Version = 0 |
| | Bit 6: Ack Flag = 0, No data link layer acknowledgement |
| | Bits 5-4: Protocol Identifier = 11b, Extended Protocol |
| | Bits 3-2: FCS Mode = 11b, 4 byte CRC |
| | Bits 1-0: Address Mode = 01b, Long address with source and destination |
| Address: | Destination Vendor = 0xAA, Vendor specific value |
| | Destination Device ID = 0xBBBBBBBB, Unique vendor specific value |
| | Source Vendor = 0xCC, Vendor specific value |
| | Source Device ID = 0xDDDDDDDD, Unique vendor specific value |
| Network Service ID: | 0x02, Device Info Network Service |
| Request Opcode: | 0x07 Extended Device Info Request |

FIG. 36 illustrates a PDU format for an extended device info response, according to various embodiments of the present subject matter. Table 37 provides further information for the extended device info response illustrated in FIG. 36, according to various embodiments. Various embodiments use other formats.

TABLE 37

| | |
|---|---|
| Size: | Indicates that there are 45 bytes following |
| Frame Descriptor: | Bit: Version = 0 |
| | Bit 6: Ack Flag = 0, No data link layer acknowledgement |
| | Bits 5-4: Protocol Identifier = 11b, Extended Protocol |
| | Bits 3-2: FCS Mode = 11b, 4 byte CRC |
| | Bits 1-0: Address Mode = 01b, Long address with source and destination |

TABLE 37-continued

| | |
|---|---|
| Address: | Destination Vendor = 0xCC, Same value as in the request Source Vendor |
| | Destination Device ID = 0xDDDDDDDD, Same value as in the request Source Device ID |
| | Source Vendor = 0xAA, Vendor specific value |
| | Source Device ID = 0xBBBBBBBB, Unique vendor specific value |
| Network Service ID: | 0x02, Device Info Network Service |
| Response Opcode: | 0x0a Extended Device Info Reply |
| Extended Device Info Data: | Extended device info unique to this node |

Table 38 illustrates a format for the extended device info data, according to various embodiments. Various embodiments use other formats.

TABLE 38

| Field Name | Length (bytes) | Description | Position in payload |
|---|---|---|---|
| Device Type | 1 | Table 39 | 2 |
| Device Model | 8 | Vendor defined device description | 3-10 |
| Device Serial Number | 8 | Vendor encoded serial number | 11-18 |
| Device Side | 1 | Table 40 | 19 |
| Link Version | 1 | nEARlink version number | 20 |
| Link MTU | 1 | Largest Receive PDU | 21 |
| Link Options | 1 | Table 41 | 22 |
| Link Audio | 1 | Number of streams supported | 23 |

Table 39 illustrates values for a device type of this node, according to various embodiments. Various embodiments use other formats.

TABLE 39

| Value | Description |
|---|---|
| 0x01 | Programming Device |
| 0x02 | Hearing Instrument |
| 0x03 | Remote Control |
| 0x04 | FM Shoe |
| 0x05-0xff | Reserved |

The device model field is a detailed identifier of the device using a vendor defined encoding scheme; the device serial number is a vendor defined encoding of the device serial number (or part of it); and, the device side shows whether this device has been left/right assigned. Table 40 illustrates valid values for device side. Various embodiments use other formats.

TABLE 40

| Value | Description |
|---|---|
| 0x00 | Unknown |
| 0x01 | Left |
| 0x02 | Right |

The link version field is the version of nEARlink supported. The starting value is 0x01. The link MTU field identifies the largest PDU that a node can receive. The link options field is a bit field that identifies other options that the node supports. A bit is 1 if the option is supported, and 0 if the option is not supported. The options are shown in Table 41. Various embodiments use other formats.

TABLE 41

| 7:2 | 1 | 0 |
|---|---|---|
| Reserved | Power Save Support | 8b/10b Encoding Support |

The link audio field contains the number of audio streams supported by the device. A value of 0 indicates that no audio streams are supported.

FIG. 37 illustrates a PDU format for an audio info request, according to various embodiments of the present subject matter. Audio info request PDUs are fixed in size. Table 42 provides further information for the audio info request illustrated in FIG. 37, according to various embodiments. Various embodiments use other formats.

TABLE 42

| | |
|---|---|
| Size: | Indicates that there are 13 bytes following |
| Frame Descriptor: | Bit 7: Version = 0 |
| | Bit 6: Ack Flag = 0, No data link layer acknowledgement |
| | Bits 5-4: Protocol Identifier = 11b, Extended Protocol |
| | Bits 3-2: FCS Mode = 11b, 4 byte CRC |
| | Bits 1-0: Address Mode = 01b, Long address with source and destination |
| Address: | Destination Vendor = 0xAA, Vendor specific value |
| | Destination Device ID = 0xBBBBBBBB, Unique vendor specific value |
| | Source Vendor = 0xCC, Vendor specific value |
| | Source Device ID = 0xDDDDDDDD, Unique vendor specific value |
| Network Service ID: | 0x02, Device Info Network Service |
| Request Opcode: | 0x0b Audio Info Request |

Audio info response PDUs have a variable size depending on how many audio streams are supported in a node. The minimum size of a response is 0x0e. This includes the stream count field with no supported streams. Table 43 illustrates an audio info data field. Various embodiments use other formats.

TABLE 43

| Field Name | Length (bytes) | Description | Position in payload |
|---|---|---|---|
| Stream Count | 1 | >=0 | 2 |
| Stream [ID, Frequency] | 2 * (Stream Count) | [Stream ID, Frequency pairs] | 3 – (2 + Length) |

FIG. 38 illustrates a PDU format for an audio info response with two streams supported, according to various embodiments of the present subject matter. Table 44 provides further information for the audio info response with two streams supported illustrated in FIG. 38, according to various embodiments. Various embodiments use other formats.

TABLE 44

| | |
|---|---|
| Size: | Indicates that there are 21 bytes following |
| Frame Descriptor: | Bit 7: Version = 0 |
| | Bit 6: Ack Flag = 0, No data link layer acknowledgement |
| | Bits 5-4: Protocol Identifier = 11b, Extended Protocol |
| | Bits 3-2: FCS Mode = 11b, 4 byte CRC |
| | Bits 1-0: Address Mode = 01b, Long address with source and destination |

TABLE 44-continued

| | |
|---|---|
| Address: | Destination Vendor = 0xCC, Same value as in the request Source Vendor |
| | Destination Device ID = 0xDDDDDDDD, Same value as in the request Source Device ID |
| | Source Vendor = 0xAA, Vendor specific value |
| | Source Device ID = 0xBBBBBBBB, Unique vendor specific value |
| Network Service ID: | 0x02, Device Info Network Service |
| Response Opcode: | 0x0c Audio Info Reply |
| Audio Info Data: | 0x0201000205 - audio info for this node; two streams are supported - G.711 @ 8 KHz and G.722 @ 16 KHz |

The audio control network service provides control mechanisms for the streaming of digital audio between wireless nodes. Table 45 lists the service requests supported by the audio control network service. Various embodiments use other formats.

TABLE 45

| PDU Description | Length (bytes) | Opcode (byte) | Contents | Position in payload |
|---|---|---|---|---|
| Audio Start | 6 | 0x01 | CodecID | 2 |
| | | | CodecFs | 3 |
| | | | FrameSize | 4-5 |
| | | | Options | 6 |
| Audio Stop | 1 | 0x02 | — | |

All audio requests can be sent using any addressing mode with either long or short addresses and will be sent without requiring any type of link layer acknowledgement or application level response.

FIG. 39 illustrates a PDU format for an audio start request, according to various embodiments of the present subject matter. Table 46 provides further information for the audio start request supported illustrated in FIG. 39, according to various embodiments. Various embodiments use other formats.

TABLE 46

| | |
|---|---|
| Size: | 0x08 |
| Frame Descriptor: | Bit 7: Version Indication = 0 |
| | Bit 6: Ack Flag = 0, No data link layer acknowledgement |
| | Bits 5-4: Protocol Identifier = 11b, Extended Protocol |
| | Bits 3-2: FCS Mode = 11b, 4 byte CRC |
| | Bits 1-0: Address Mode = 10b, Short destination address and no source address |
| | Address = 0xAA, Vendor specific value |
| Network Service ID: | 0x04, Audio Control Network Service |
| Request Opcode: | 0x01 Audio Start Request |
| CodecID: | 0x02, Defines the codec used to encode the audio stream. |
| CodecFs: | 0x05, Defines the sampling rate used to encode the audio stream. Please refer to Error! Reference source not found. for a complete list of sampling rate frequencies. |
| FrameSize: | 0xC0, Defines the number of samples after decoding the data from an audio packet. In this case an audio packet will contain 72 codeword bytes (using 3 bit/sample compression). |
| Options: | 00000110b, Audio data stream options. |

The options field is a bit field that identifies configuration options associated with the audio data stream. Table 47 illustrates audio data stream options. Various embodiments use other formats.

TABLE 47

| Bit Position | Description |
| --- | --- |
| Bit 0 | 0 - Enable Link Layer Address Checking |
| | 1 - Disable Link Layer Address Checking |
| Bit 1 | 0 - Play samples as received |
| | 1 - Collect samples into a complete audio frame before playing |
| Bit 2 | 0 - Disable Error Concealment in the Audio Decoder |
| | 1 - Enable Error Concealment in the Audio Decoder |
| Bits 3-7 | Reserved |

FIG. 40 illustrates a PDU format for an audio stop request, according to various embodiments of the present subject matter. Table 48 provides further information for the Audio Stop Request supported illustrated in FIG. 40, according to various embodiments. Various embodiments use other formats.

TABLE 48

| | |
| --- | --- |
| Size: | 0x04 |
| Frame Descriptor: | Bit 7: Version Indication = 0 |
| | Bit 6: Ack Flag = 0, No data link layer acknowledgement |
| | Bits 5-4: Protocol Identifier = 11b, Extended Protocol |
| | Bits 3-2: FCS Mode = 11b, 4 byte CRC |
| | Bits 1-0: Address Mode = 10b, Short destination address and no source address |
| | Address = 0xAA, Vendor specific value |
| Network Service ID: | 0x04, Audio Control Network Service |
| Request Opcode: | 0x02, Audio Stop request |

The hearing aid (HA) control network service allows the transfer of information between hearing instruments and a programming device. The HA control network service is vendor specific and thus does not define any specific requests or responses. All HA control network service data is capable of being sent using the addressing modes defined by a vendor.

The remote control network service allows the transfer of information between hearing instruments and a remote control device. The remote control network service is vendor specific and thus does not define any specific requests or responses. All remote control network service data is capable of sent using the addressing modes defined by a vendor.

The binaural communication network service allows the transfer of information between hearing instruments. The binaural communication network service is vendor specific and thus does not define any specific requests or responses. All binaural communication network service data is capable of sent using the addressing modes defined by a vendor.

The FM control network service allows the transfer of information between accessory devices and FM transceivers, e.g., FM shoes attached to hearing instruments. The FM control network service is vendor specific and thus does not define any specific requests or responses. All FM control network service data can be sent utilizing the addressing modes defined by a vendor.

Device Level

Figure 41:
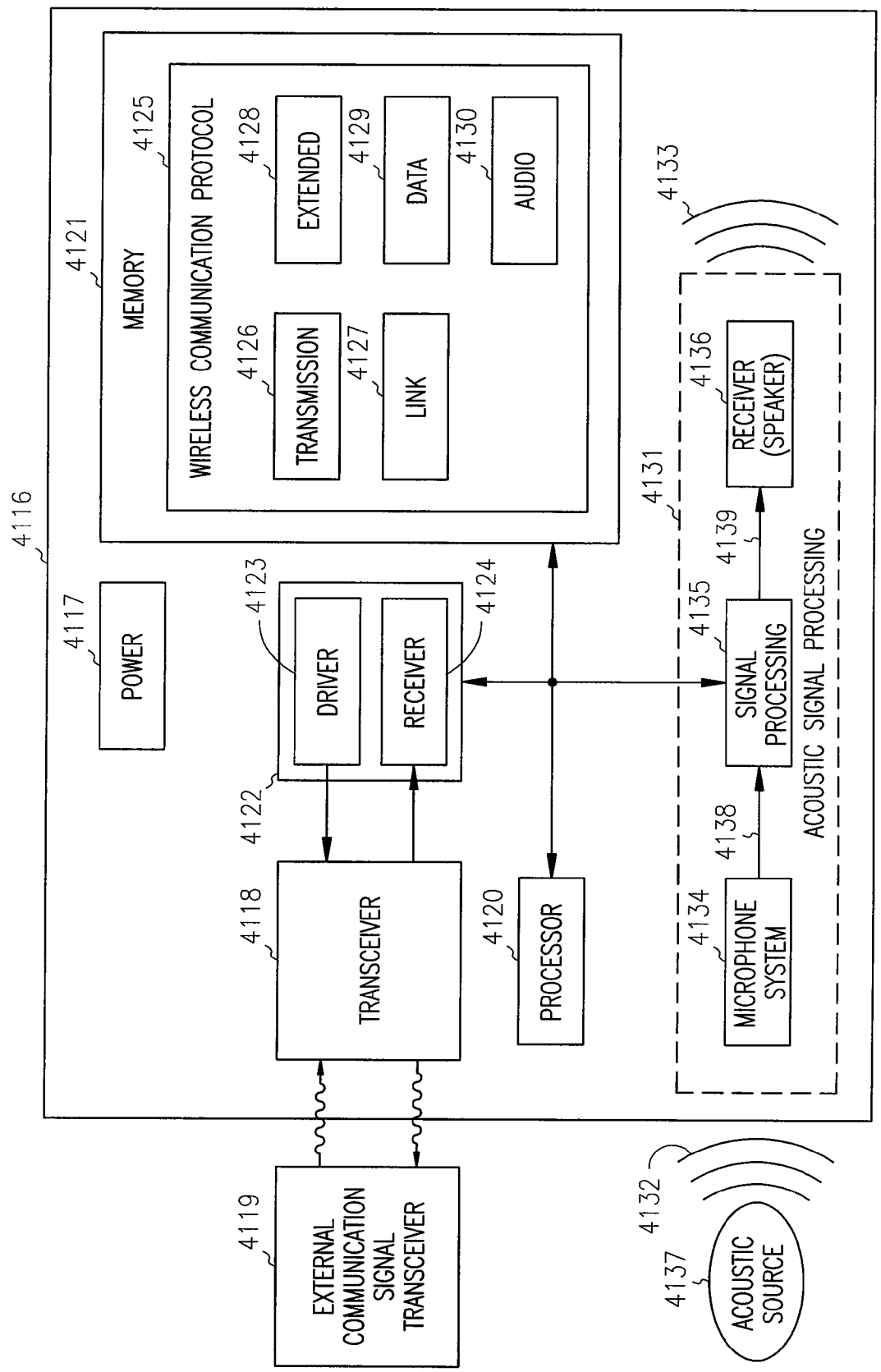
FIG. 41 illustrates a hearing instrument, according to various embodiments of the present subject matter, capable of wirelessly communicating as a node in the network of FIG. 1.

FIG. 41 illustrates a hearing instrument, according to various embodiments of the present subject matter, capable of wirelessly communicating as a node in the network of FIG. 1. One example of a hearing instrument is a hearing aid. For example, two hearing aids may communicate with each other to function as a binaural pair. In another example, a programmer wirelessly communicates with and configures a hearing aid. In another example, a hearing aid wirelessly receives a signal from an assistive listening system to provide or enhance a signal for presentation to a receiver in the hearing aid.

The illustrated hearing instrument 4116, also referred to herein as a hearing assistance device, is capable of forming any node of the wireless networks illustrated in FIGS. 1, 2A, 2B or 2C. The hearing instrument uses a wireless communication protocol, according to various embodiments of the present subject matter, to wirelessly communicate to other hearing instruments on the network.

The illustrated hearing instrument 4116 includes a power supply 4117, such as a battery. The power connections are not shown. The instrument 4116 further includes a transceiver 4118 to wirelessly transmit data and wireless receive data from an external device 4119. The hearing instrument further includes a processor 4120 and a memory 4121 capable of communicating with each other. The memory 4121 includes instructions to be operated on by the processor 4120. Circuitry 4122, including a driver 4123 and a receiver 4124, connects the processor 4120 to the transceiver 4118. The instructions to be operated on by the processor include a layered wireless communication protocol 4125. The protocol allows the hearing instrument to reliably communicate with at least one other hearing instrument on a wireless network. The protocol includes a transmission protocol module 4126, a link protocol module 4127, an extended protocol module 4128, a data protocol module 4129 and an audio protocol module 4130. These protocol modules have been discussed previously.

The present subject matter is capable of being incorporated in a variety of wireless communication system. In various embodiments, the present subject matter is incorporated into near-field communication systems and technology that use such near-field communication systems such as hearing aids, programmers, and assistive listening systems. For example, the present subject matter is capable of being used in hearing aids such as in-the-ear, half-shell, in-the-canal and completely in the canal (CIC) styles of hearing aids, as well as for behind-the-ear hearing aids. Furthermore, one of ordinary skill in the art will understand, upon reading and comprehending this disclosure, the method aspects of the present subject matter using the figures presented and described in detail above.

The hearing assistance device 4116 in FIG. 41 includes an acoustic signal processing section 4131 used to convert local sound 4132 into a processed acoustic signal 4133 for a user of the hearing assistance device. The illustrates acoustic signal processing section 4131 includes a microphone system 4134, a signal processing module 4135 and a receiver 4136, which functions as a speaker. The microphone system 4134 is local to the device 4116, and includes one or more microphones and associated circuitry to receive a sound 4132 from an acoustic source 4137, and locally convert the sound 4132 into an acoustic-based signal 4138. The acoustic-based signal 4138 is received and processed by the signal processing module 4135 into a processed acoustic-based signal 4139. Examples of signal processes include, but are not limited to amplification, filtering, and attenuation. The particular signal processing depends on the desired application. The receiver 4136 receives and converts the processed acoustic-based signal 4139 into the processed acoustic signal 4133.

In various embodiments, the methods provided above are implemented as a computer data signal embodied in a carrier wave or propagated signal, that represents a sequence of instructions which, when executed by a processor cause the processor to perform the respective method. In various embodiments, methods provided above are implemented as a set of instructions or algorithm contained on a computer-accessible medium capable of directing a processor to perform the respective method. In various embodiments, the medium is a magnetic medium, an electronic medium, or an optical medium. In various embodiments, the instructions are organized in a data structure. The layered protocol or protocol stack described above, or portions thereof, can be considered to be a data structure that contains a number of data fields. Thus, for example, the general link layer PDU format illustrated in FIG. 11 can be referred to as a data structure that includes a frame start flag field, a size field, a frame descriptor field, an address field, an extended protocol field, a payload field, a frame check sequence field, and a frame end flag field.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments, and other embodiments will be apparent to those of skill in the art upon reviewing the above description. Some illustrations and tables provide data field sizes, bit mapping to data values, and data sequences. Other protocol embodiments use other data field sizes, other bit mapping to the same or other data values, and/or other data sequences. The scope of the present subject matter should be determined with reference to the appended claims, along with the full scope of legal equivalents to which such claims are entitled.

What is claimed is:

1. A hearing instrument, comprising:
   a transceiver to wirelessly transmit data and wirelessly receive data over a single wireless communication channel;
   a processor and a memory capable of communicating with each other, the memory including instructions to be operated on by the processor; and
   circuitry connecting the processor to the transceiver,
   wherein the instructions to be operated on by the processor include a layered wireless communication protocol for use to communicate with at least one other node on a wireless network, the layered wireless communication protocol including:
      a transmission protocol module operating at a first layer of the wireless communication protocol to control and monitor transceiver operation, wherein the transmission protocol module is adapted to control transceiver operations to provide half duplex communication over the single wireless communication channel;
      a link protocol module operating at a second layer of the wireless communication protocol to define data transmitting and receiving procedures, and present data suitable for transmission, wherein the link protocol module is adapted to implement a packet transmission process to account for frame collisions;
      an extended protocol module, a data protocol module, and an audio protocol module, each of the extended protocol module, the data protocol module, and the audio protocol module operating at a third layer of the wireless communication protocol, the extended protocol module to provide access to network service protocols, the data protocol module to communicate data regarding control and configuration information for hearing instruments, and the audio protocol module to communicate digital audio, wherein the audio protocol module is adapted to stream digital audio one way over the single wireless communication channel.

2. The hearing instrument of claim 1, wherein the single wireless communication channel has a carrier frequency of approximately 3.84 MHz.

3. The hearing instrument of claim 1, wherein the transceiver is adapted to wirelessly transmit and receive data over transmission distances up to approximately 1 meter.

4. The hearing instrument of claim 1, wherein the transmission protocol module is adapted to modulate data signals using amplitude shift keying (ASK).

5. The hearing instrument of claim 1, wherein the transmission protocol module is adapted to transmit and receive data signals at a net data rate of approximately 50 Kbits per second.

6. The hearing instrument of claim 1, wherein the packet transmission process includes:
   in response to a transmission request, determining if a channel is free, and transmitting a packet if the channel is free;
   if the channel is not free, determining if a counter is exceeded;
   if the counter is exceeded, abandoning a packet transmission attempt;
   if the counter is not exceeded, sniffing until the channel is free; and
   upon determining that the channel is free, waiting for a random timer event, and then proceeding to determine if the channel is free.

7. The hearing instrument of claim 1, wherein the wireless network includes a number of hearing instruments from a number of vendors, the link protocol module providing a protocol data unit including a destination address, each address including a vendor identifier field and a device identifier field such that every hearing instrument is capable of communicating with any other hearing instrument on the wireless network.

8. The hearing instrument of claim 1, wherein the protocol data unit further includes a source address.

9. The hearing instrument of claim 1, wherein the link protocol module is adapted to provide a long address with the vendor identifier field and the device identifier field to uniquely identify a network node, and to dynamically provide an application-specific short address to identify the network node after it is uniquely identified using the long address.

10. The hearing instrument of claim 1, wherein the hearing instrument includes a hearing aid capable of wirelessly communicating with another instrument, the hearing aid including the transceiver, the processor, the memory, and the circuitry connecting the processor to the receiver.

11. The hearing instrument of claim 1, wherein the extended protocol module, the data protocol module, and the audio protocol module in the third layer are adapted to communicate with the link protocol module in the second layer, and the link protocol module in the second layer is adapted to communicate with the transmission protocol module in the first layer.

12. The hearing instrument of claim 1, wherein the transmission protocol module is configured to:
   provide read data services, write data services, and carrier sense services;
   encode a protocol data unit (PDU) to promote proper receiver operation and receiver phase locked loop (PLL) clock derivation; and
   serialize data for the single wireless communication channel.

13. The hearing instrument of claim 1, wherein the link protocol module is configured to define unicast, multicast and broadcast communication transmissions.

14. The hearing instrument of claim 1, wherein the link protocol module is configured to provide a protocol data unit, including a frame start flag field, a size field, a frame descriptor field, an address field, an extended protocol field, a payload field, a frame check sequence field, and a frame end flag field.

15. The hearing instrument of claim 14, wherein the extended protocol field is adapted to hold an indicator for a selected network service.

16. The hearing instrument of claim 15, wherein the indicator for a selected network service includes an indicator for a baseband control network service.

17. The hearing instrument of claim 15, wherein the indicator for a selected network service includes an indicator for a device information network service.

18. The hearing instrument of claim 15, wherein the indicator for a selected network service includes an indicator for an audio control network service.

19. The hearing instrument of claim 15, wherein the indicator for a selected network service includes an indicator for a hearing aid network service.

20. The hearing instrument of claim 15, wherein the indicator for a selected network service includes an indicator for a remote control network service.

21. The hearing instrument of claim 15, wherein the indicator for a selected network service includes an indicator for a binaural communication network service.

22. The hearing instrument of claim 15, wherein the indicator for a selected network service includes an indicator for an FM control network service.

23. A hearing instrument, comprising:
- a transceiver to wirelessly transmit data and wirelessly receive data over a single wireless communication channel;
- a processor and a memory capable of communicating with each other, the memory including instructions to be operated on by the processor; and
- circuitry connecting the processor to the transceiver,
- wherein the instructions to be operated on by the processor include a layered wireless communication protocol for use to communicate with at least one other node on a wireless network, the layered wireless communication protocol including:
  - a transmission protocol module operating at a first layer of the wireless communication protocol to control and monitor transceiver operation, wherein the transmission protocol module is adapted to control transceiver operations to provide half duplex communication over the single wireless communication channel;
  - a link protocol module operating at a second layer of the wireless communication protocol to define data transmitting and receiving procedures, and present data suitable for transmission, wherein the link protocol module is adapted to implement a packet transmission process to account for frame collisions;
  - an extended protocol module, a data protocol module, and an audio protocol module, each of the extended protocol module, the data protocol module, and the audio protocol module operating at a third layer of the wireless communication protocol, the extended protocol module to provide access to network service protocols, the data protocol module to communicate data regarding control and configuration information for hearing instruments, and the audio protocol module to communicate digital audio, wherein the audio protocol module is adapted to stream digital audio one way over the single wireless communication channel;
- wherein the packet transmission process includes:
  - in response to a transmission request, determining if a channel is free, and transmitting a packet if the channel is free;
  - if the channel is not free, determining if a counter is exceeded;
  - if the counter is exceeded, abandoning a packet transmission attempt;
  - if the counter is not exceeded, sniffing until the channel is free; and
  - upon determining that the channel is free, waiting for a random timer event, and then proceeding to determine if the channel is free, and
- wherein the wireless network includes a number of hearing instruments from a number of vendors, the link protocol module providing a protocol data unit including a destination address, each address including a vendor identifier field and a device identifier field such that every hearing instrument is capable of communicating with any other hearing instrument on the wireless network.

24. The hearing instrument of claim 23, wherein the link protocol module is adapted to provide a long address with the vendor identifier field and the device identifier field to uniquely identify a network node, and to dynamically provide an application-specific short address to identify the network node after it is uniquely identified using the long address.

25. A hearing instrument, comprising:
- a transceiver to wirelessly transmit data and wirelessly receive data over a single wireless communication channel;
- a processor and a memory capable of communicating with each other, the memory including instructions to be operated on by the processor; and
- circuitry connecting the processor to the transceiver,
- wherein the instructions to be operated on by the processor include a layered wireless communication protocol for use to communicate with at least one other node on a wireless network, the layered wireless communication protocol including:
  - a transmission protocol module operating at a first layer of the wireless communication protocol to control and monitor transceiver operation, wherein the transmission protocol module is adapted to control transceiver operations to provide half duplex communication over the single wireless communication channel;
  - a link protocol module operating at a second layer of the wireless communication protocol to define data transmitting and receiving procedures, and present data suitable for transmission, wherein the link protocol module is adapted to implement a packet transmission process to account for frame collisions;
  - an extended protocol module, a data protocol module, and an audio protocol module, each of the extended protocol module, the data protocol module, and the audio protocol module operating at a third layer of the wireless communication protocol, the extended protocol module to provide access to network service protocols, the data protocol module to communicate data regarding control and configuration information for hearing instruments, and the audio protocol module to communicate digital audio, wherein the audio protocol module is adapted to stream digital audio one way over the single wireless communication channel, wherein the transmission protocol module is configured to provide read data services, write data services, and carrier sense services, encode a protocol data unit (PDU) to promote proper receiver operation and receiver phase locked loop (PLL) clock derivation, and serialize data for the single wireless communication channel, and wherein the link protocol module is configured to define unicast, multicast and broadcast communication transmissions.

26. The hearing instrument of claim 25, wherein the link protocol module is configured to provide a protocol data unit, including a frame start flag field, a size field, a frame descriptor field, an address field, an extended protocol field, a payload field, a frame check sequence field, and a frame end flag field.

* * * * *